US011505027B2

(12) United States Patent
Brown

(10) Patent No.: US 11,505,027 B2
(45) Date of Patent: Nov. 22, 2022

(54) SUSPENSION CONTROL ASSEMBLY AND A KIT OF PARTS FOR

(71) Applicant: Kenneth Norman Brown, Greenwood, IN (US)

(72) Inventor: Kenneth Norman Brown, Greenwood, IN (US)

( * ) Notice: Subject to any disclaimer, the term of this patent is extended or adjusted under 35 U.S.C. 154(b) by 0 days.

(21) Appl. No.: 17/485,458

(22) Filed: Sep. 26, 2021

(65) Prior Publication Data

US 2022/0111697 A1    Apr. 14, 2022

Related U.S. Application Data

(60) Provisional application No. 63/085,106, filed on Sep. 29, 2020.

(51) Int. Cl.
| | |
|---|---|
| *B60G 21/05* | (2006.01) |
| *B60G 21/00* | (2006.01) |
| *B60G 5/04* | (2006.01) |
| *B60G 7/00* | (2006.01) |

(52) U.S. Cl.
CPC ............ *B60G 21/05* (2013.01); *B60G 5/043* (2013.01); *B60G 7/001* (2013.01); *B60G 21/005* (2013.01)

(58) Field of Classification Search
CPC ........ B60G 21/05; B60G 5/043; B60G 7/001; B60G 21/005
See application file for complete search history.

(56) References Cited

U.S. PATENT DOCUMENTS

| | | | | |
|---|---|---|---|---|
| 3,497,233 A | * | 2/1970 | Bolaski, Jr. .......... | B60G 21/007 280/124.109 |
| 7,357,400 B2 | * | 4/2008 | Serra ...................... | B62D 17/00 280/124.134 |
| 2019/0168559 A1 | * | 6/2019 | Brown ..................... | B60G 9/00 |

FOREIGN PATENT DOCUMENTS

| | | | | |
|---|---|---|---|---|
| CN | 110001324 A | * | 7/2019 | ............. B60G 21/05 |
| FR | 2872089 A1 | * | 12/2005 | ........... B60G 21/007 |

OTHER PUBLICATIONS

Wes Duenkel, The Differences Between a Panhard Bar and a Watt's Link, www.streetmusclemag.com/tech-stories/brakes-suspension/differences-panhard-bar-watts-link/, Dec. 24, 2018.
See attached article.

* cited by examiner

*Primary Examiner* — Drew J Brown
(74) *Attorney, Agent, or Firm* — Richard J. Godlewski

(57) ABSTRACT

Disclosed is a vehicular suspension control assembly and a kit of parts therefore configured to connect to opposite ends of a vehicle axle housing and to opposite sides of the vehicle. The assembly includes a control module configured to connect to the opposite ends of the vehicle axle housing and a frame module configured to connect to the opposite sides of the vehicle. The control and frame modules are interconnected with pivot control members to allow both modules to keep equal weight on the rear wheels during vehicle cornering. The control module has a straight pivot link connected to one side of the axle housing and an interconnected asymmetrical pivot link connected to the other side of the axle housing. When cornering, additional weight is applied to one side of the axle housing. In response, the pivot links of the control assembly transfer weight to the other side of the housing, to keep equal weight on the rear wheels.

20 Claims, 17 Drawing Sheets

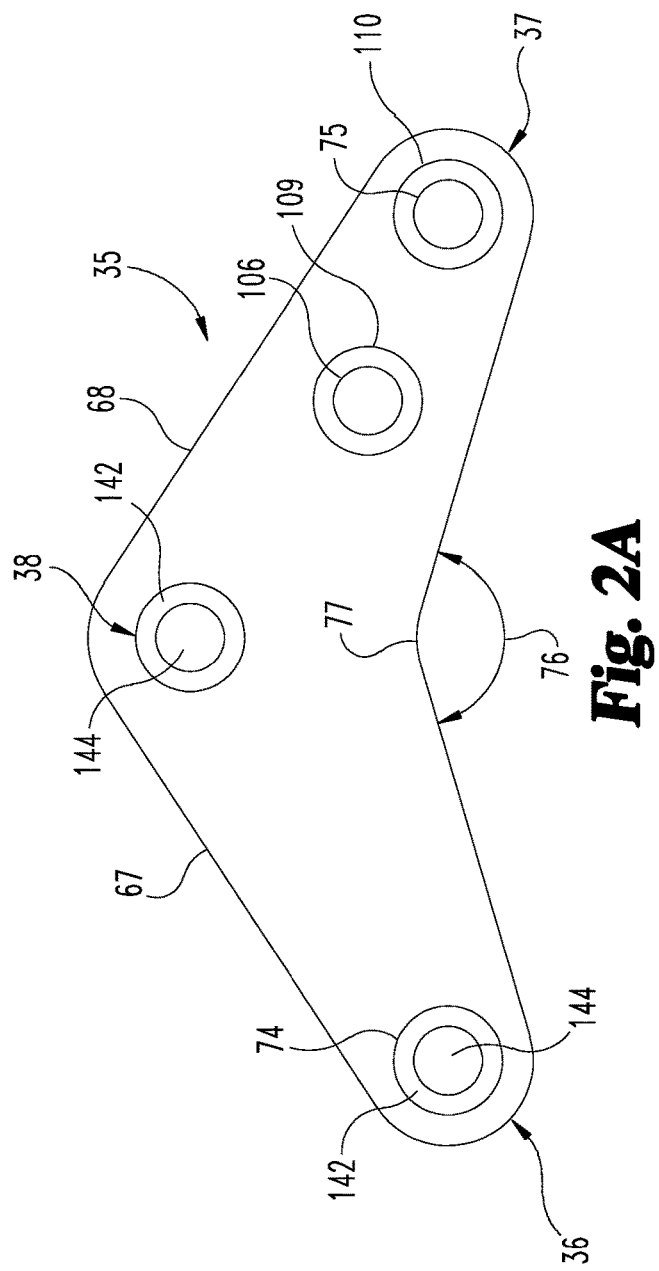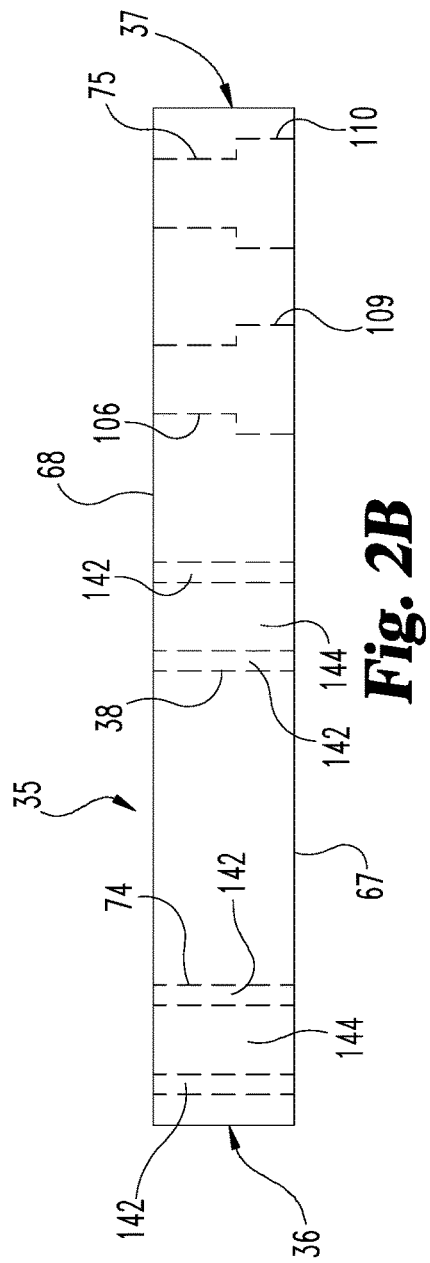

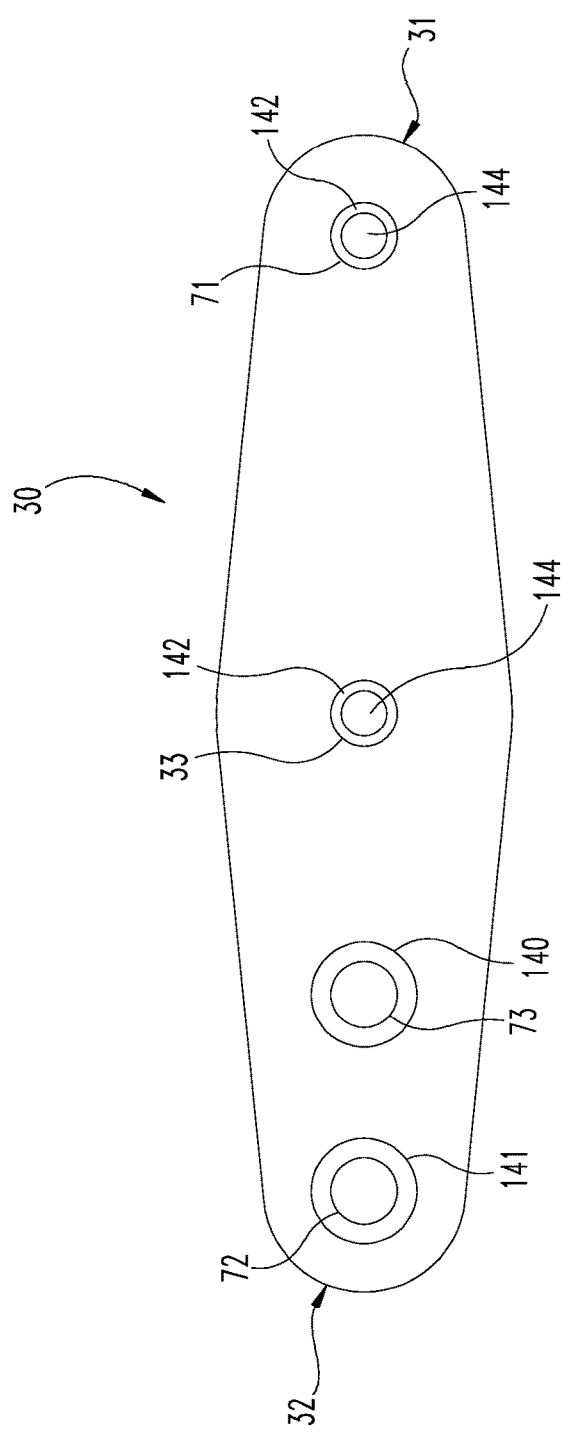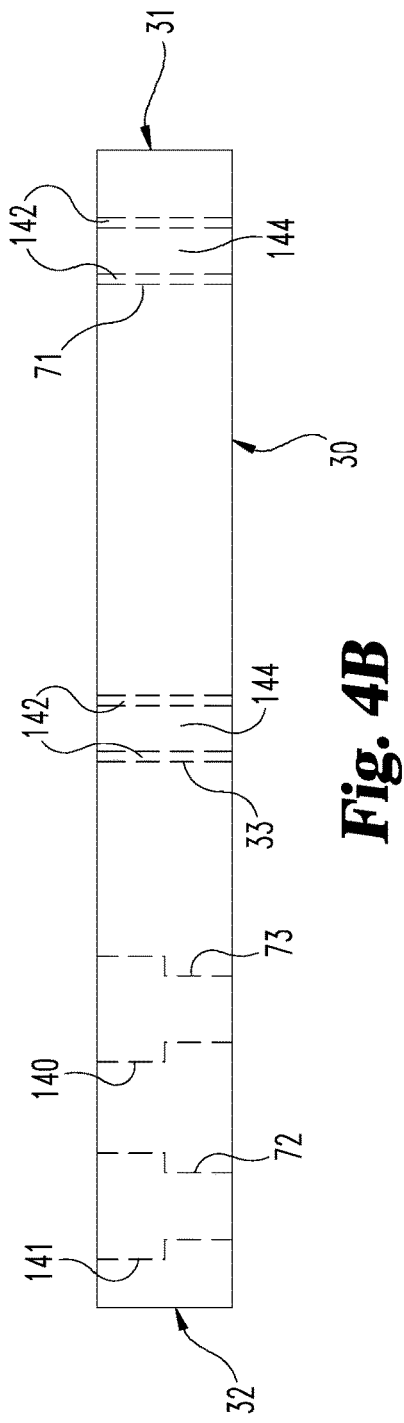

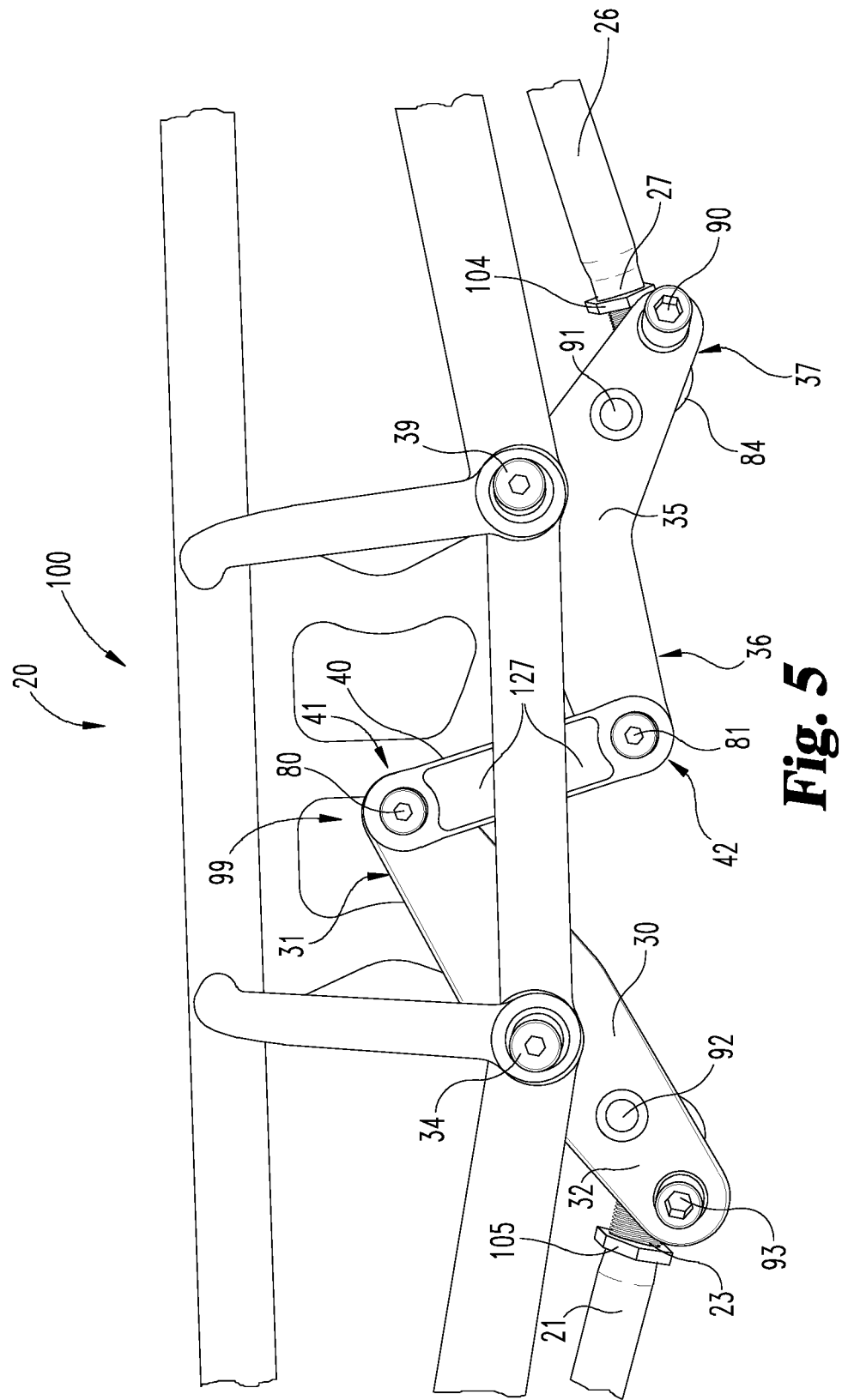

SUSPENSION CONTROL ASSEMBLY AND A KIT OF PARTS FOR

TECHNICAL FIELD

This invention generally relates to vehicular suspensions and, particularly, to a control assembly and a kit of parts for a vehicular suspension that keeps both rear wheels on the ground during cornering.

BACKGROUND OF THE INVENTION

In performance driving with live-axle or straight rear-axle suspensions, automobiles going around a corner at high speeds can create significant loss of traction. As the body of the car rolls in cornering, the rear axle rolls as well and in performance driving creates a potentially unsafe traction condition.

When driving in a straight line there is equal weight (force) on both rear tires. In high-speed cornering as the rear body/axle rolls going through the corner, the weight on the inside tire lessens and begins to lift off the road, which in turn reduces the tire contact patch to the road. As the weight on the rear outside tire increases, it can overwhelm the amount of grip available through the rear tire contact patch, producing what is referred to as a loose condition equating to the loss of control of the rear of the car.

Rear anti-sway bars help reduce the roll differential between the rear body components, but this can still lead to excessive weight transfer and loss of control.

SUMMARY OF THE INVENTION

The foregoing problems are solved, and a technical advance is achieved in a suspension control assembly of the present invention for a straight axle housing of a vehicle. The suspension control assembly includes two major modules, a K-Link control module connected to the frame module. The frame module attaches the K-link control module to the car. The frame module is vehicle specific but can be adapted for any number of live-axle cars.

The K-Link control module includes five major components: left and right radius rods each attachable to one end of the straight rear axle housing; straight and asymmetrical pivot links each attachable to the other end of the left and right radius rods, respectively; and a short straight link for interconnecting the straight and the asymmetrical pivot links. The frame module is configured to connect and stabilize the K-Link control module to the left and the right sides of the vehicle chassis and to the left and right ends of the rear axle. First (left) and second (right) pivot members (first and second fasteners) interconnect the frame module and the K-Link control module. When a downward force is applied to one end of the axle housing, the K-Link control module advantageously pushes the other end of the axle housing downward to maintain the axle housing in a substantially level position with equal downward force on each tire.

The frame has first (left) and second (right) attachment ends that are configured to fixedly attach to opposite sides (left and right) of the vehicle chassis, respectively. The frame has a first or lower and a second or upper elongate member each having first and second opposite (left and right) attachment ends configured to connect to opposite vehicle sides, respectively.

First (back) and second (front) extensions are radially spaced from each other and extend perpendicularly between the first and the second elongate members. The first extension also interconnects with the first elongate member adjacent the first (left) and the second (right) pivot member attachment orifices thereof. This posits the first and second extension midway along the first and second elongate members. The second extension is attached to the second elongate member and radially spaced from the first extension. The second extension includes third (left) and fourth (right) pivot member orifices at the far radial edge thereof. The pivot member orifices of the first and the second extensions are aligned with each other to insert the first and the second pivot members therethrough. The first and the second pivot members also extend through the pivot orifices of the straight and the symmetrical pivot links. Accordingly, when connected to the vehicle, the K-link control module is advantageously centered about the roll axis of the axle housing and attached to the frame. During high-speed cornering, this allows the K-Link control frame module or suspension control assembly to keep equal force on both rear wheels and to maintain control of the vehicle. Thus, the vehicle is much more stable during high-speed cornering and reducing the possibility of the rear of the vehicle getting unstable and out of control with the car possibly spinning around.

To help balance the forces on each rear wheel during high-speed cornering, the asymmetrical link includes first and second legs with an angle therebetween in the range of 95 degrees to 175 degrees, particularly in the range of 115 degrees to 160 degrees, and more particularly in the range of 155 degrees to 160 degrees. The length of the radius rods is adjustable to balance the weight on each wheel during high-speed cornering. The radius rods can be lengthened or shortened to adjust the rear roll center.

In another aspect, the present invention is directed to a kit of parts for a suspension control assembly for a vehicle. The control assembly includes parts for the K-Link control module for transferring and balancing the force at each axle housing end and to each rear wheel. The frame module connects the K-Link control module to both sides of the vehicle. The K-Link control module connects to each end of the vehicle's rear axle housing.

The K-Link control module includes a straight pivot link, an asymmetrical pivot link, a short straight link for interconnecting the straight and the asymmetrical pivot links. The pivot links interconnect the first (left) and second (right) radius rods each with first (left) and second (right) rod ends. Also included are first through fourth rod attachment members for each end of the radius rods. The first (left) and fourth (right) rod attachment members are adapted to connect to the left and the right axle housing ends, respectively. The second (right) and third (left) rod attachment members are configured to connect to the left end of the straight pivot link and the right end of the asymmetrical pivot link, respectively.

The frame includes left and right frame ends configured to connect to the left and right vehicle attachment brackets on respective opposite sides of the vehicle chassis. The frame includes a first or lower and a second or upper elongate member. The first elongate member is configured to attach to the rear vehicle attachment brackets on opposite sides of the vehicle. The first elongate member also has first (left) and second (right) attachment orifices centrally disposed there along to receive respective first (left) and second (right) pivot members (bolts or fasteners). The first pivot member (bolt or fastener) is configured to also pass through the pivot orifice in the straight pivot link. The second pivot member (bolt or fastener) is configured to also pass through the pivot orifice in the asymmetrical pivot link. The pivot members (bolts or fasteners) interconnect the K-Link control module and the frame module.

The second elongate member of the frame module is likewise configured to attach to the opposite sides of the vehicle chassis. A first (back) extension is connected centrally between the first and the second elongate frame members. The second (front) extension is attached to the first elongate frame member and radially spaced from the back extension. The K-Link control module is posited in the space between the back and front extensions. The front extension has first and second attachment orifices along the far edge thereof that align with the first (left) and second (right) attachment orifices in the first elongate frame member. The first and second pivot members are configured to pass through the respective first and second attachment orifices of the back and front extensions as well as the pivot point orifices in the respective straight and asymmetrical pivot links. Thus, the first and second attachment members (bolts or fasteners) interconnect the K-Link control and the frame modules. In addition, the straight and asymmetrical pivot links are advantageously longitudinally aligned with the roll centers of the axle housing and the vehicle body.

BRIEF DESCRIPTION OF THE DRAWING

FIGS. 2A and 2B depict illustrative front and top views of the asymmetrical pivot link of FIG. 1;

FIGS. 4A and 4B depict illustrative front and top views of straight pivot link of FIG. 1;

FIG. 5 is a front view picture or drawing of the center section of the suspension control assembly of FIG. 1;

DETAILED DESCRIPTION

Figure 1:
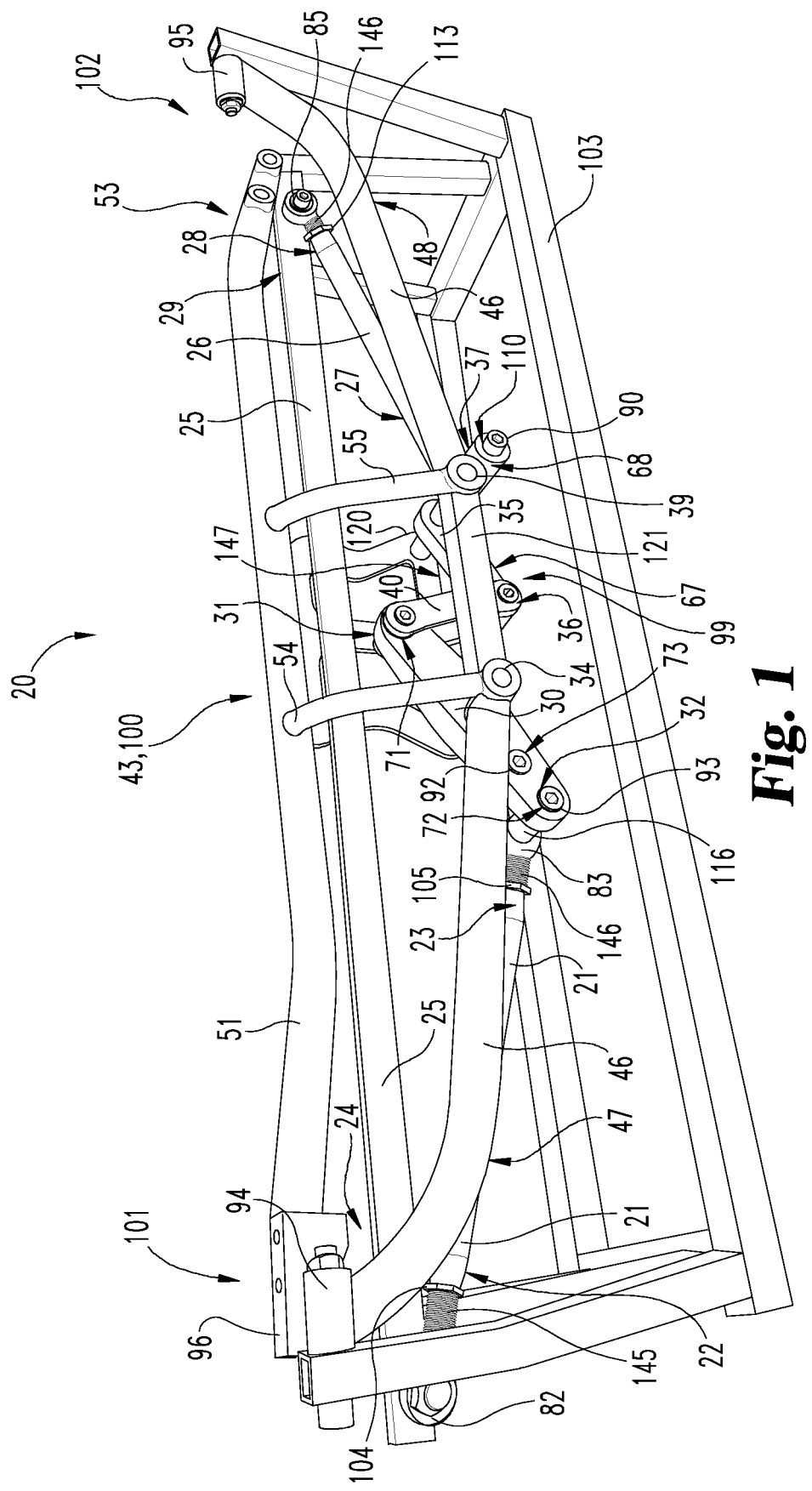
FIG. 1 is an elevated view picture or drawing of the invention with the left side of suspension control assembly 20 extended forward and attached to display stand 103.

FIG. 1 is an illustrative elevated view picture or drawing of the present invention with the left side of suspension control assembly 20 extended forward and attached to display stand 103. In this illustrative embodiment, the suspension control assembly 20 includes a suspension control module 99 and a frame module 100 or a single unit frame 43 interconnected by a first or left-side 34 and a second or right-side 39 pivot fastener such as commercially available round Allen-head stripper bolts. When the suspension control module is connected to the opposite ends of a vehicle's straight axle housing, and the frame module 100 or frame 43 is connected to the opposite sides of the vehicle and a downward force is applied to one end of the straight axle housing, the other end of the axle housing is pushed down by the suspension control assembly to maintain the straight axle housing in a level position during cornering. Thus, both rear wheels maintain contact with and apply equal force to the road, and the vehicle can advantageously and quickly corner in a controlled manner without losing control of the rear end of the vehicle. Normally, when a vehicle makes a hard turn in a corner, the weight on one of the rear wheels is lessened with the wheel losing traction and causing the rear end of the vehicle to become unstable and possibly out of control. Eventually, the rear end of the vehicle spins to the other side of the road leaving the driver looking back from where he came. The suspension control assembly works the same with the vehicle in either a left or right turn and keeps the vehicle in a controlled condition.

Figure 3:
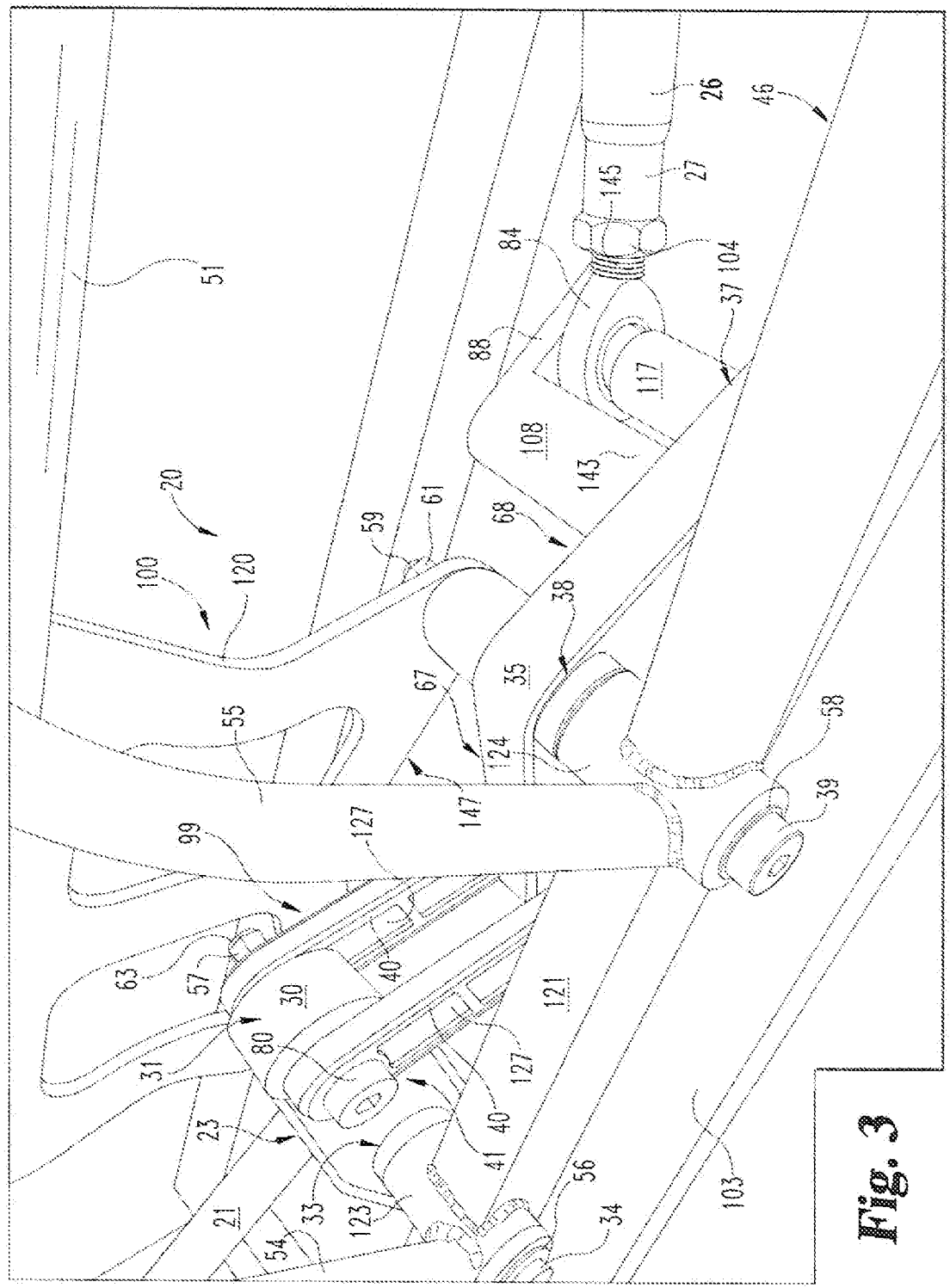
FIG. 3 is a partially enlarged view picture or drawing of the interconnected suspension control module and frame module of FIG. 1.

FIG. 3 is a partially enlarged picture or view of interconnected suspension control module 99 and frame module 100 of FIG. 1. In FIGS. 1 and/or 3, control module 99 includes a first or left-side radius rod 21 and a second or right-side radius rod 26 that are configured to connect to a first or left axle housing end 24 and a second or right axle housing end 29, respectively. Straight bar 25 in FIG. 1 represents the straight, rear axle housing of a vehicle, and will be described later in subsequent figures. The first radius rod includes a first or a left end 22 and a second or right end 23 opposite the first radius rod end and configured to connect to a first or left housing end 24 of a straight axle housing 25 and a first or left straight link end 32 of straight pivot link 30, respectively.

The first and the second radius rods 21 and 26 are each for example approximately 13-inches long with a 1.00-inch outside diameter and a wall thickness of 0.22 inches. Each radius rod has right-hand internal machine threads extending axially therein at one respective end 22 or 27 and left-hand machine threads at the opposite respective end 23 or 28. Radius rod attachment members or eyebolts 82 and 84, also known as rod ends, include right-hand external machine threads 145. Eyebolts or rod ends 83 and 85 include left-hand external machine threads 146 such as, for example, a 0.625-inch commercially available external machine threaded eyebolt or rod end. A right-hand threaded locknut 104 fixedly positions each right-hand threaded eyebolt 82 and 84 at one end of the associated radius rod. A left-hand threaded locknut 113 fixedly positions each left-hand threaded eyebolt 83 and 85 at the opposite end of the radius rod. The locknuts are loosened to allow the overall length of a radius rod to be adjusted and subsequently tightened to fixedly position the eyebolt and the radius rod end during installation on the rear axle housing of a vehicle. The adjustment of the radius rod lengths works the same way as a commercially available turnbuckle. Adjusting the radius rod length will raise or lower the rear roll center.

In FIGS. 1 and 3, the suspension control module 99 includes straight pivot link 30 and asymmetrical pivot link 35 interconnected by a pair of short straight links 40. Short straight links 40 have a length of approximately 5.1875-inches and are shorter in length than straight pivot link 30, which has a length of approximately 8.75-inches. The straight 30 and the asymmetrical 35 pivot links have a respective first 33 and a second 38 pivot link bore or hole with a diameter of approximately 0.625-inches. The bores permit the two outer interconnected links to rotate about fixedly positioned interconnection fasteners or bolts 34 and 39, respectively, which extend through respective link bores 33 and 38 and keep equal downward force on the ends of the rear axle housing.

FIGS. 2A and 2B depict illustrative side and top views of asymmetrical pivot link 35 with a first or left-side leg 67 and a second or right-side leg 68 at intersection 77 with a leg angle 76 therebetween. Leg angle 76 is preferably 157 degrees and can range from 115 to 160 degrees or alternatively 95 to 175 degrees. Asymmetrical pivot link 35 is approximately 7.5-inches wide and 1.00-inches thick as depicted in FIG. 2B. The asymmetrical pivot link end connection bores 74 and 75 have their centers approximately 6.25-inches apart. Pivot link bore 38 is disposed perpendicularly and approximately 1.91-inches from the center line between the centers of leg end connection bores 74 and 75 and approximately 3.125-inches midway between the centers of the end connection bores. Pivot link bore 38 and the first or left-side asymmetrical leg end bore 74 are similarly positioned.

FIGS. 2A and 2B also depict a first or left asymmetrical link leg 67 that includes a left leg connection bore 74 having an approximate 0.625-inch diameter disposed at first or left link end 36. A commercially available OILITE® material bearing sleeve 142 has a 0.625-inch outside diameter, and a 0.50-inch inside diameter bore 144 disposed in connection end bore 74 and pivot link bore 38. The pivot link bore is positioned midway between first and second leg end bores 74 and 75 with centers that are spaced apart approximately 6.25-inches. Pivot link bore 38 is also positioned approximately 1.91-inches perpendicular to a centerline between the centers of the leg end bores 74 and 75. Leg end retainer bore 75 at leg end 37 has an approximate 0.5-inch diameter with a counterbore 110 having an approximate 0.797-inch diameter to a depth of 0.50-inches as depicted in FIG. 2B. Right end penultimate retainer bore 106 has an approximately 0.50-inch diameter with an approximate 0.797-inch diameter counterbore 109 to a 0.50-inch depth. Penultimate retainer bore 106 is approximately 0.5940-inches from the center line between leg end bores 74 and 75 and approximately 4.875-inches from the center of left leg end bore 74.

FIGS. 4A and 4B depict illustrative side and top views of straight pivot link 30. For example, straight pivot link 30 is a single piece of aluminum approximately 8.75-inches long, 2.25-inches wide and 1.00-inches thick. The distance between the centers of straight link end bores 71 and 72 is approximately 7.25-inches with pivot link bore 33 disposed halfway in-between on the center line between the link end bores. Penultimate connection bore 73 is approximately 1.50-inches away from left end retainer bore 72 on the center line between the two link end bores (holes). Retainer bores (holes) 72 and 73 are approximately 0.50 inches in diameter and have a 0.80-inch counterbore to a depth of 0.50 inches. Pivot link bore (hole) 33 and link end connection bore 71 have an approximate 0.625-inch diameter with a commercially available OILITE® material bearing sleeve 142 having an approximate 0.625-inch outside diameter, a 0.50-inch inside diameter bore 144, and a 1.00-inch length disposed in the bores. The width of straight pivot link 30 tapers on each side from its' center width of approximately 2.25-inches to a width at the center of link end bores 71 and 72 of approximately 1.75-inches with rounded ends 31 and 32 having a 0.75-inch radius.

FIG. 5 is a front view picture of the center section of the suspension control assembly 20 of FIG. 1. Control assembly 20 includes suspension control module 99 and frame module 100 that are interconnected by first or left 34 and second or right 39 pivot and interconnection fasteners such as commercially available Allen head bolts and locknuts. The suspension control module 99 includes a first or left radius rod 21 and a second or right radius rod 26 that connect to the opposite ends of the vehicle's straight axle housing. The second or right end 23 of the left radius rod 21 connects to the first or left end 31 of straight pivot link 30, whereas the first or left end 27 of the right radius rod 26 connects to the second or right end 37 of asymmetrical pivot link 35. The ends of the radius rods are connected to the left end 31 of the straight pivot link 30 with fasteners 92 and 93 and the right end 37 of the asymmetrical pivot link 35 with the aid of a first 90 and a second 91 pivot link end fasteners such as commercially available Allen head bolts. The second or right end 32 of the straight pivot link 30 and the first or left end 36 of the asymmetrical pivot link 35 are interconnected by a pair of short straight links 40 disposed on the front and back faces of the two pivot links with first 80 and second 81 short link fasteners such as commercially available Allen head bolts and lock nuts. The short straight links 40 have in this example a length of approximately 4.90 inches long, 1.25 inches wide and 0375-inches thick and are shorter in length than the straight pivot link 30 having a length of approximately 8.750 inches long.

Figure 6:
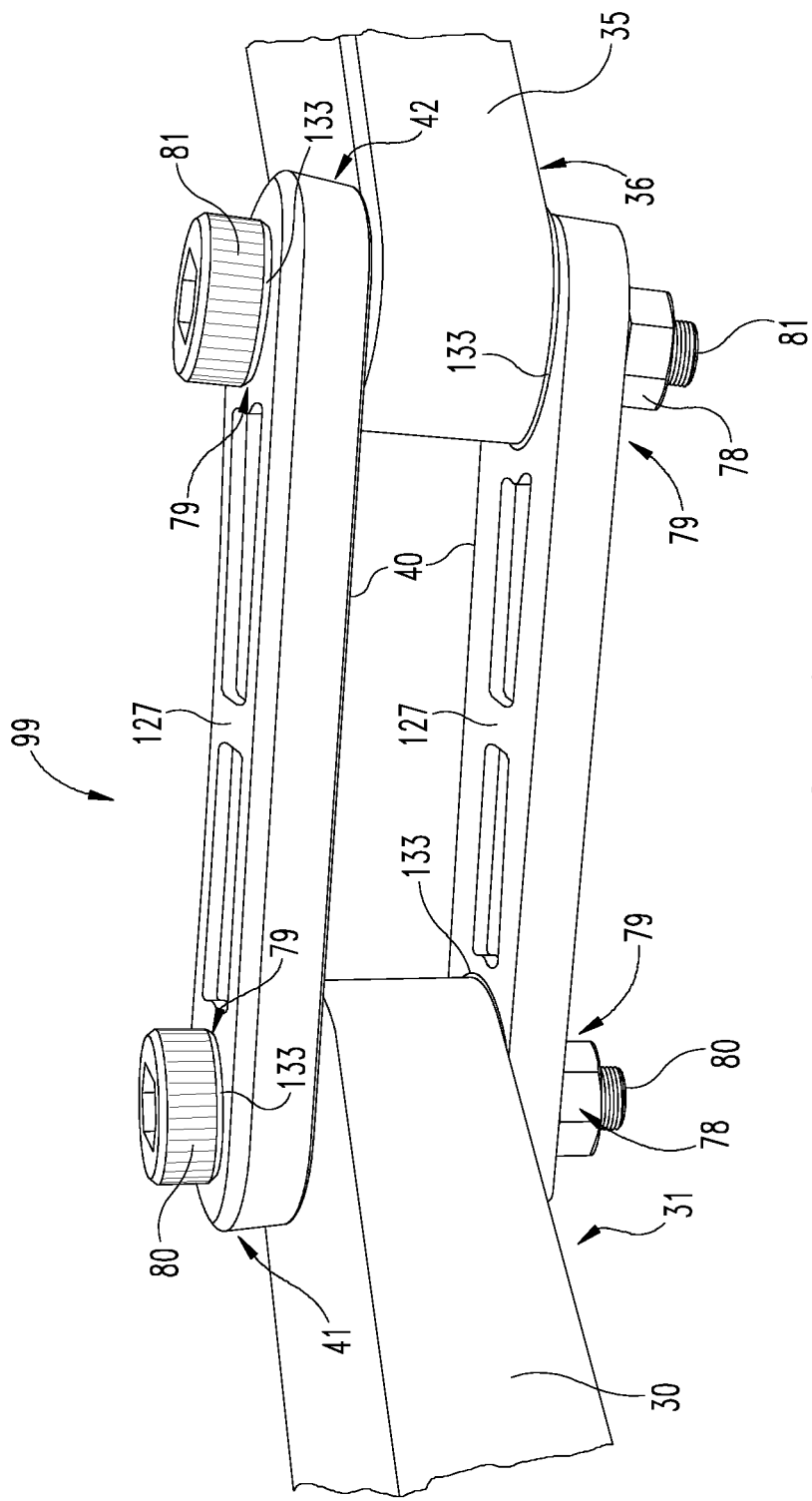
FIG. 6 is an enlarged view picture or drawing of the center section of the suspension control module of FIG. 1.

FIG. 6 is an enlarged picture of center, short straight link pair 40 of the suspension control module 99 of FIG. 1. Short straight link pair 40 interconnects the right end 32 of straight pivot link 30 and the left end 36 of asymmetrical pivot link 35 to transfer the forces between the asymmetrical and straight links. To help distribute the stress of the moving components, short straight link pair 40 is disposed on opposite faces of the two link ends 32 and 36 and interconnected with respective commercially available Allen head bolts 80 and 81 with locknuts 78. As pictured, one face of each short straight link includes two indented portions separated by an integrally formed cross member 127. The ends 41 and 42 of each short link include a 0.625-inch hole with a counter bore 133 having an approximately 0.95-inch diameter and a depth of 0.056-inches. An UHMW washer having a 0.50-inch inside diameter, a 0.875-inch outside diameter and a thickness of 0.062-inches is disposed in the counterbores. The UHMW washer faces the underside of the bolt head and straight pivot link end 32. A black, commercially available, Acetal/Delrin bushing (142 as shown in FIGS. 2A, 2B, 4A, and 4B) having an outside diameter of 0.625-inches, an inside diameter of 0.502-inches and a length of approximately 0.312-inches is disposed in each of the smaller diameter link holes. The washer and bushing help make the link holes easier for the bolts extending therethrough to rotate therein and to minimize wear of the interconnected link holes. When the vehicle is cornering, these interconnected parts are subject to significant forces, which overtime will significantly wear a bare metal hole.

Figure 8:
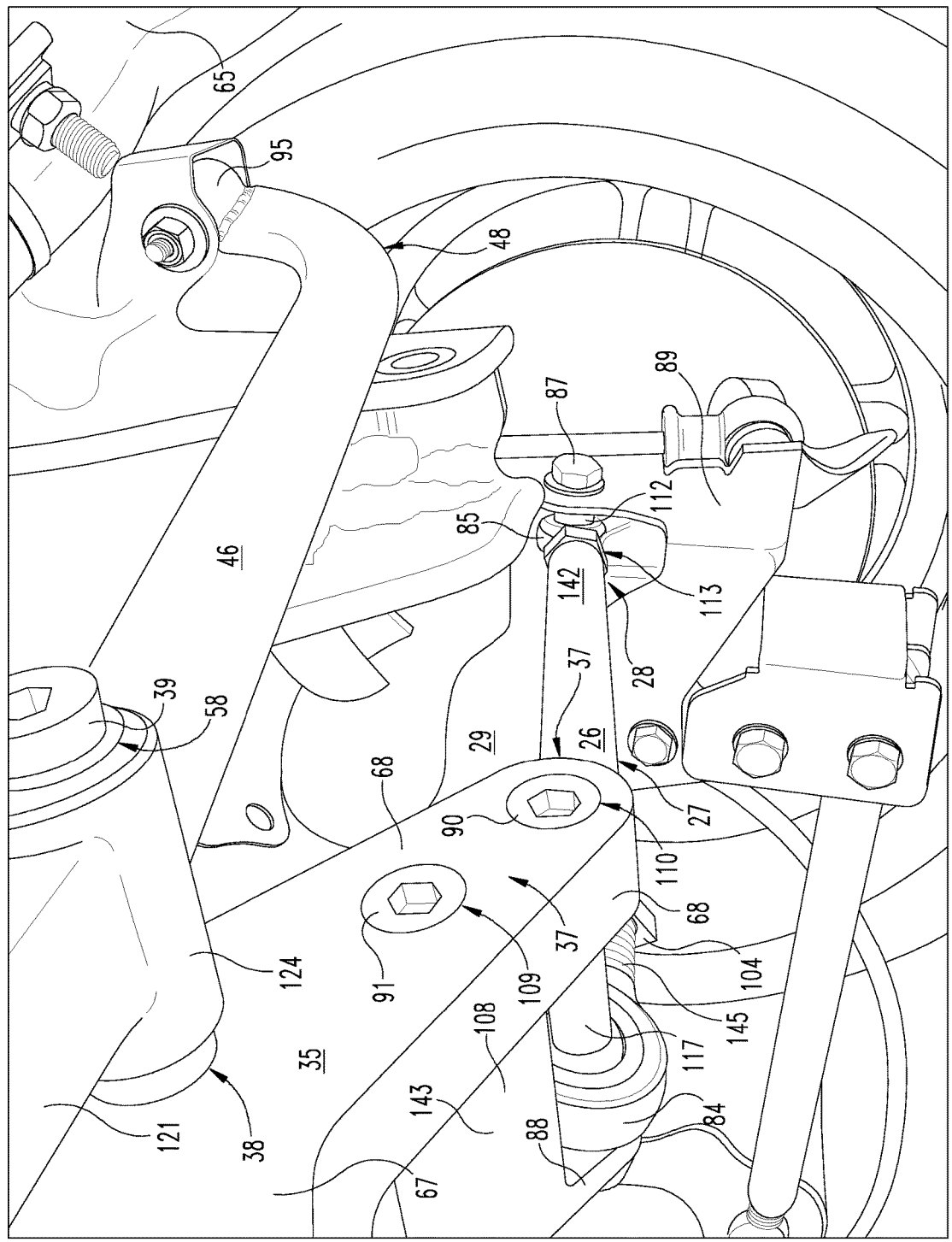
FIG. 8 is a picture or drawing of right radius rod connected to the right end of the right side of axle housing as partially pictured or viewed in FIG. 1.

As pictured or depicted again in FIGS. 3 and 8, the long leg 143 of right L-shaped retainer 108 is perpendicularly fastened to second or right asymmetrical link leg end 37 with a flush-mounted, 0.50-inch Allen-head bolt 91 extending through counterbored retainer bore 109 and into a threaded end bore of the long leg. The short leg 88 of the L-shaped retainer is fastened to link leg end 68 with a 0.50-inch diameter Allen-head, flush-mounted bolt 90 that extends through counterbored leg end bore 110, long cylindrical spacer 117, the eye of eyebolt 84 of right radius rod 26, and the threaded bore of short leg 88. Also shown are a right-hand thread locknut 104 and a left-hand thread locknut 113 that fixes the relative position between the threaded portion of an eyebolt and a radius rod end.

Depicted in the pictures and drawings of FIGS. 1, 3, 4A and 4B, straight pivot link 30 is a single piece of aluminum approximately 8.75 inches long, 2.25 inches wide and 1.00 inches thick. The distance between the centers of straight link end bores 71 and 72 is approximately 7.25 inches. The pivot link bore 33 is disposed halfway in-between on the center line between the straight link end bores. Penultimate connection bore 73 is approximately 1.50-inches away from end connection bore 72 on the center line between the two end bores 72 and 73. The penultimate bore 73 is approximately 0.50 inches in diameter and has a 0.80-inch counterbore to a depth of 0.50 inches. Pivot link bore 33 and link end connection bore 71 have an approximate 0.625-inch diameter with a commercially available OILITE® material, bearing sleeve 121 having an approximate 0.625-inch outside diameter, a 0.50-inch inside diameter and a 1.00-inch length disposed in the bores. The width of straight pivot link 30 tapers on each side from its' center width of approximately 2.25-inches to a width at connection bores 71 and 72 of approximately 1.75-inches with rounded ends 31 and 32 having a 0.75-inch radius.

FIG. 3 also pictures or depicts the interconnection of first or lower elongate frame member 46 and second or upper elongate frame member 51 of frame 43 or frame module 100 with straight pivot link 30 and asymmetrical pivot link 35 of the suspension control module. First 34 and second 39 module interconnection fasteners such as commercially available hex-head machine bolts interconnect the frame and the suspension control modules and in doing so extend through the first and the second pivot point orifices 33 and 38 of respective straight 30 and asymmetrical 35 pivot links. A first or left-side lateral interconnecting member 54 extends between and perpendicularly connects to the first and the second elongate frame members 46 and 51, respectively. The interconnection of the first or left-side lateral interconnecting member and the frame members is facilitated with well-known welding. Second or right-side lateral interconnecting member 55 is likewise perpendicularly connected to the lower frame member 46 with well-known welding. The first and second lateral interconnecting members are positioned adjacent one another at the ends of center section separation bar 121 disposed in the lower elongated frame member 46. The second lateral interconnecting member includes first 56 and second 58 bores positioned across from and aligned with first and second attachment bores 49 and 50, respectively. First 34 and second 39 fasteners such as commercially available 0.50-inch, round Allen-head bolts interconnect lower elongate frame member 46, fastener tube 123, a short-length spacer, straight pivot link bore 33, first extension bore 56 of first lateral extension 54 and lock nut 57 on the threaded-end of fastener 34. Thus, the straight pivot link 30 can rotate freely about first fastener 34 to transfer force to and from the second or right rod end of the first radius rod 21 via the first radius rod attachment member (eyebolt).

Figure 7:
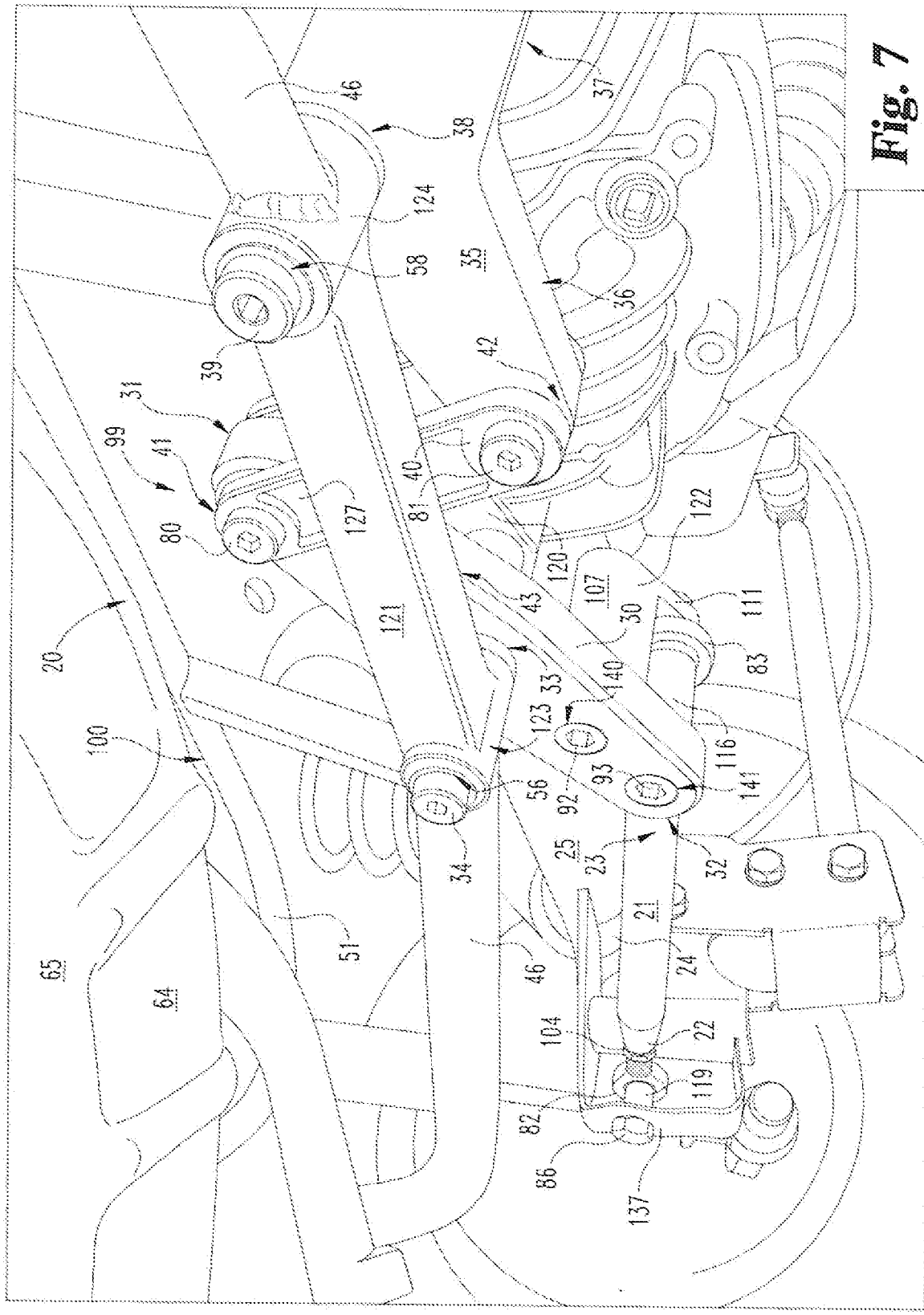
FIG. 7 is a view picture or drawing of the left end of the left radius rod connected to the left side of the straight axle housing as pictured in FIG. 1.

FIG. 7 is a picture of the left end 22 and the right end 23 of left radius rod 21 respectively connected to left end 24 of axle housing 25 and to left end 32 of straight pivot link 30, both of assembly 20 of FIG. 1. Left radius rod attachment member or right-hand threaded eyebolt 82 is threaded into the right-hand threads extending into the left end 22 of radius rod 21. When tightened, right-hand threaded locknut 104 fixedly positions the eyebolt relative to the end of the radius rod. When loosened, locknut 104 and its right-hand radius rod complement of parts permits the overall length of the radius rod to be adjusted to raise or lower the rear roll center. First or left vehicle attachment member or hex head machine bolt and locknut 86 attach eyebolt 82 to the left end 24 of axle housing 25.

Figure 14:
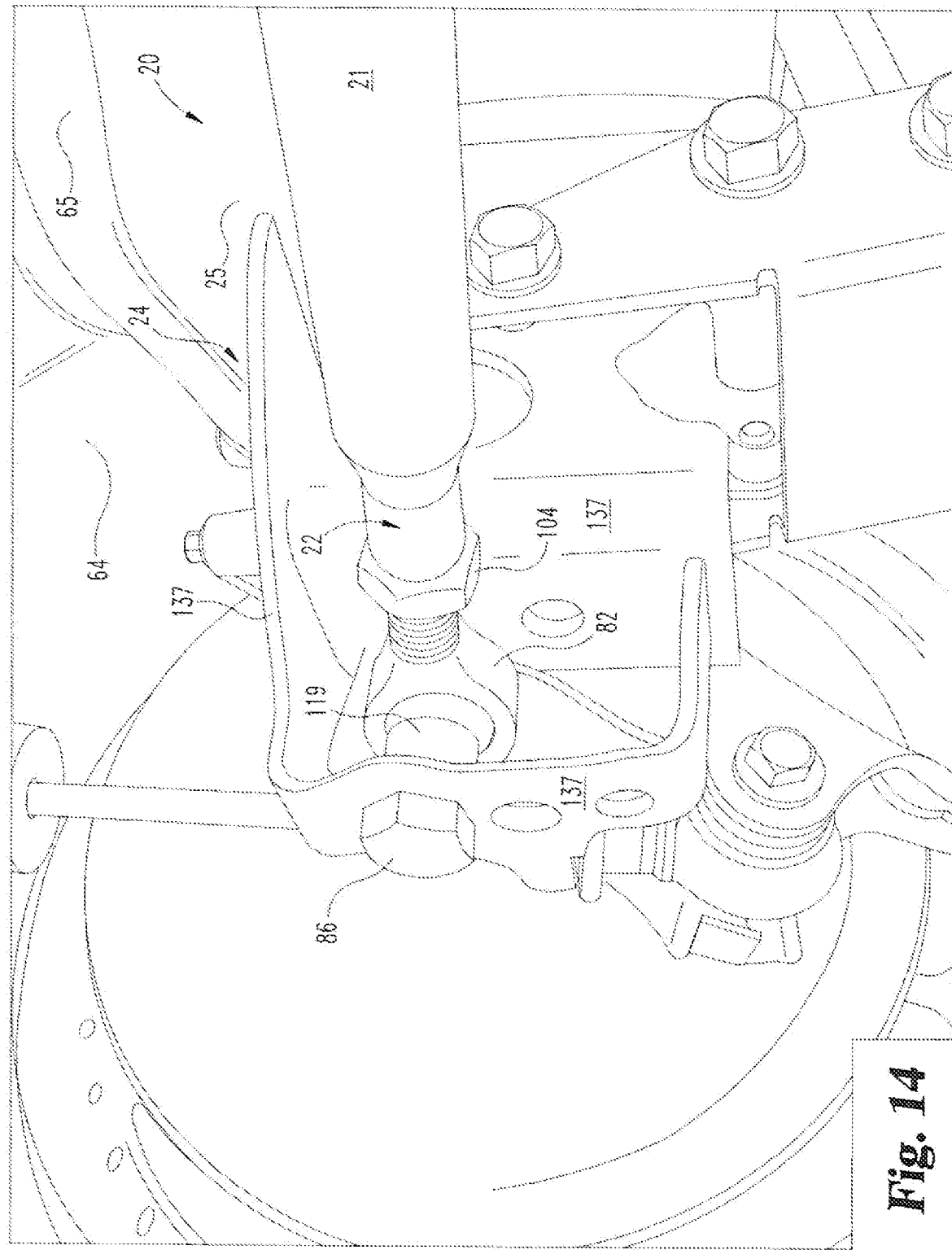
FIG. 14 pictures suspension control assembly of FIG. 1 connected to the attachment bracket at the left housing end of the straight axle housing.

FIG. 14 is an enlarged picture or drawing of left axle housing end 24 of straight axle housing 25 of FIG. 7. The suspension control assembly 20 connects to left axle housing end 24 via mounting bracket 137. Left radius rod attachment member or eyebolt 82 of left radius rod 21 is fastened to left axle housing end 24 with first or left end vehicle attachment fastener 86 such as a commercially available hex-head machine bolt and locknut. Fastener 86 extends through left end mounting bracket 137, short cylindrical spacer sleeve 119, eyebolt 82 and left end mounting bracket 137.

Returning to FIG. 7, the right end 23 of left radius rod 21 is attached to left straight pivot link end 32. L-shaped retainer 107 is fastened to left pivot link end 32 with retainer fasteners 92 and 93 (bolts) extending through respective penultimate 140 and left 141 counterbored retainer bores. Long leg 122 of L-shaped retainer 107 is fastened to the left link end 32 with fastener 92, whereas the short leg 111 is fastened with fastener 93. Right eyebolt 83 of the left radius rod 21 is fastened to left straight link end 32 with left retainer fastener 93 extending through counterbored retainer bore 141, long cylindrical spacer sleeve 116, eyebolt 83 and into the short retainer leg 111. The long retainer leg 122 is fastened to the straight pivot link end 32 with penultimate retainer fastener 92 extending through counterbored retainer bore 140 and into the long leg. The straight pivot link 30 is rotatably connected to frame 43 or frame module 100 with left interconnection or pivot link fastener 34 extending through left fastener sleeve bore 56 of the first or left, center section fastener sleeve 123, straight pivot link bore 33 and into the left, lower threaded bore of front extension plate 120. A pair of short straight links 40 interconnect the right straight pivot link end 31 and left asymmetrical pivot link end 36 with respective left 80 and right 81 interconnection fasteners (bolts and locknuts) extending through the end bores or holes at respective short link ends 41 and 42.

FIG. 8 pictures or depicts asymmetrical pivot link 35 rotatably connected to the frame via first or right, center section fastener sleeve 124 with interconnection or pivot faster 39 extending through bore or hole 58 of the sleeve, asymmetrical pivot link bore 38 and threaded into the right, lower threaded bore of extension plate 120 of FIG. 1. The right end 68 of symmetrical pivot link is fastened to the left end of the right radius rod in like manner as the previously described interconnection of the right end of the left radius rod 21 to the left end of the straight pivot link 30.

Right radius rod 26 is connected to the right axel housing end 29 as also partially pictured in FIG. 1. The right radius rod attachment member or eyebolt 85 at right end 28 of right radius rod 26 is connected to right housing end 29 of the straight axle housing with right vehicle attachment member or hex-head bolt 87. The bolt with a washer passes through a top bore of right axle bracket 89, cylindrical eyebolt spacer sleeve 112, the aperture of eyebolt 85 and into an existing threaded hole in the right housing end 29 of the straight axle housing of the vehicle. In this embodiment, the vehicle is a 2005-2014 Ford Mustang.

FIG. 8 also pictures eyebolt 84 connected to right asymmetrical link end 37 with L-shaped retainer 108 attached thereto with leg end fastener 90 passing through counterbored leg end bore 110, long cylindrical spacer sleeve 117, the bore of the eyebolt and short retainer leg 88. Retainer fastener 91 passes through counterbored retainer bore 109 in the end of right asymmetrical leg end 37 and into a threaded bore in the main leg of L-shaped retainer 108 for secure attachment to asymmetrical leg end 37. Left-hand threaded locknut 113 fixedly positions the eyebolt 85 relative to right radius rod end 28

Figure 9:
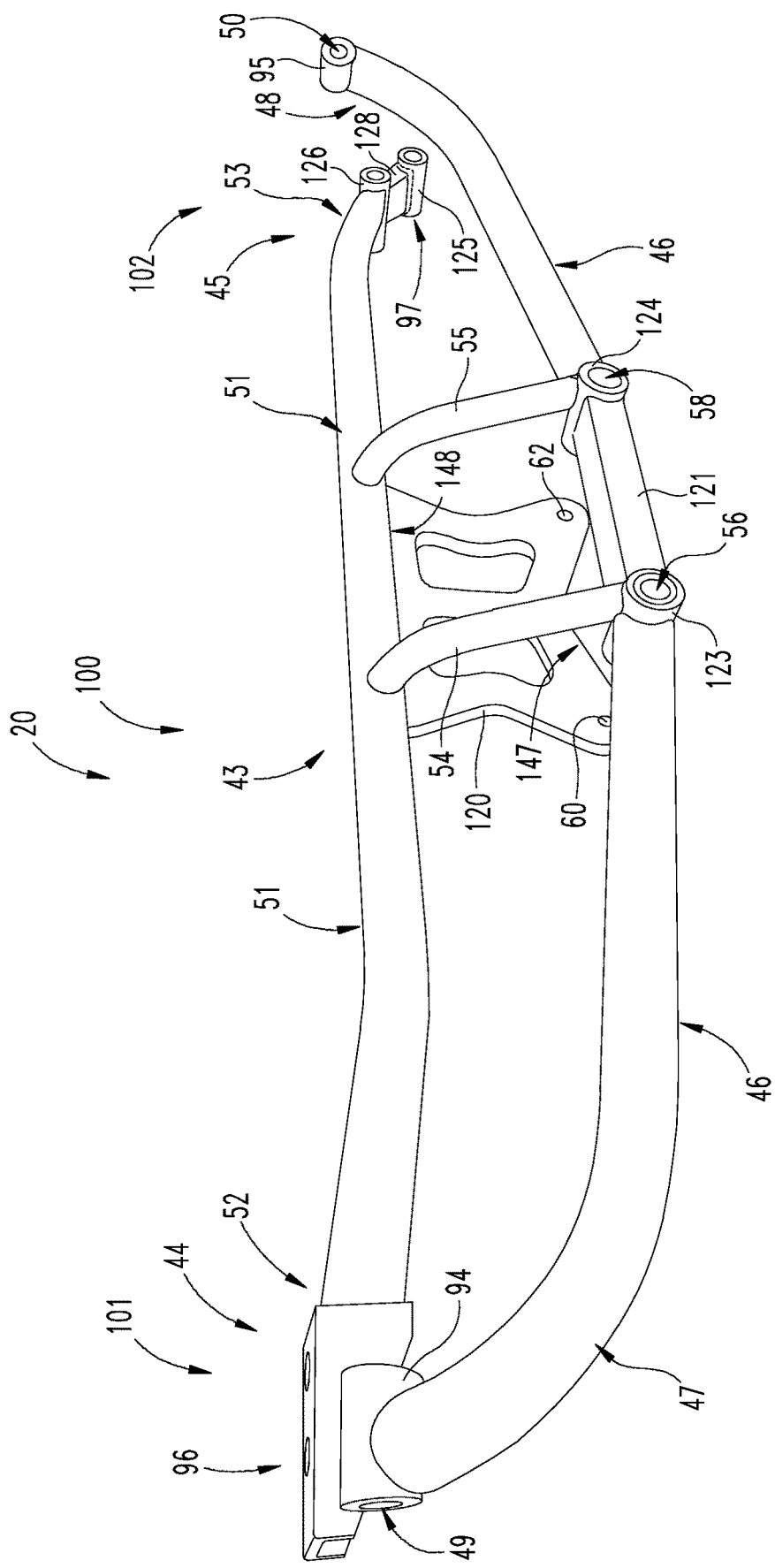
FIG. 9 is a picture or drawing of frame 43 or frame module 100 of suspension control assembly 20 as pictured or viewed in FIG. 1.

FIG. 9 is a picture of frame 43 or frame module 100 of suspension control assembly 20 as pictured in FIG. 1. The frame module includes frame 43 with a first or lower 46 and a second or upper 51 elongate frame member with respective left 101, 44 and right 102, 45 attachment ends that attach to the sides of a vehicle. Attached to left end 52 of upper member 51 is wedge-shaped vehicle attachment assembly 96 that connects directly to the left bottom of a car chassis. Attached to right end 53 of upper member 51 is right-side vehicle attachment assembly 97 that connects directly to the right bottom side of the car chassis. Right-side vehicle attachment assembly 97 includes right end 125 and penultimate positioned end 126 vehicle attachment sleeves separated by separation bar 128. Attached to the left end 47 of lower elongate frame member 46 is vehicle attachment sleeve 94 with vehicle attachment bore 49 extending therethrough.

Attached to left end 52 of upper elongate frame member 51 is wedge-shaped vehicle attachment assembly 96 that directly connects to the left bottom of the car chassis. Attached to right end 53 of the upper elongate frame member 51 is right-side vehicle attachment assembly 97 that directly connects to the right bottom of the car chassis. Right-side vehicle attachment assembly 97 includes right-end 125 and penultimate-end 126 vehicle attachment sleeves separated by separation bar 128. The left-end 47 of lower elongate frame member 46 includes vehicle attachment sleeve 94 with vehicle attachment bore 49 extending therethrough for attachment to the left bottom of the car chassis.

First or left 54 and second or right 55 lateral interconnecting members interconnect the lower and the upper elongate frame members 46 and 51 midway between the ends thereof. The ends of the lateral interconnecting members 54 and 55 are welded in a well-known manner perpendicular to the first and the second elongate members 46 and 51. First or left 123 and second or right 124 interconnection fastener sleeves are perpendicularly disposed and welded at the ends of member center bar 121 and to lateral interconnecting members 54 and 55, respectively.

By way of example, center section separation bar 121 is approximately 1.00-inches high, 1.25-inches deep and 7.375-inches long between the approximate centers of the welded fastener sleeves 123 and 124. The sleeves are approximately 2.00-inches long with a 1.25-inch outside diameter, a 0.624-inch inside diameter and a 0.90-inch counterbore at the face of the center bar. The counterbored face of the sleeve is approximately 0.25-inches from the front face of the center bar and 0.50-inches from the rear face. The left and the right sections of lower elongate frame member 46 are welded to the fastener sleeves along with the interconnecting frame members 54 and 55. First or lower elongated frame member 46 is an approximately 1.25-inch outside diameter, 12-gauge (⁷⁄₆₄-inch, 0.1094-inch) D.O.M. steel tube. Second or upper elongated frame member 51 has an approximately 0.8125-inch outside diameter, 12-gauge D.O.M. steel tube, whereas interconnecting frame members 54 and 55 have an approximate 0.750-inch outside diameter, 12-gauge D.O.M. steel tube. Lateral extension 120 is an approximately 0.375-inch-thick steel plate with threaded ½-13-inch extension bores 60 and 62 with their centers 7.375-inches apart and 5.21-inches from top edge 128, which is welded to the second or upper elongated frame member 51. Extension bores 60 and 62 are disposed next to the lower extension plate edge 147 and aligned with respective first and second interconnecting bores 56 and 58 of respective center end sleeves 123 and 124. The steel plate is approximately 6.00-inches high and 8.625-inches wide with the bottom triangularly recessed in approximately 2.25-Inches and the sides triangularly recessed in approximately 1.25-inches. Two kidney-shaped openings are formed as pictured in the steel plate. The upper edge 148 of the extension plate is welded to upper elongated frame member 51. The bottom of the front extension plate face is disposed approximately 4.29-inches from the front of the interconnection fastener sleeves 123 and 124 with respective sleeve holes 56 and 58 being aligned with respective tapped extension plate holes 60 and 62.

Figure 10:
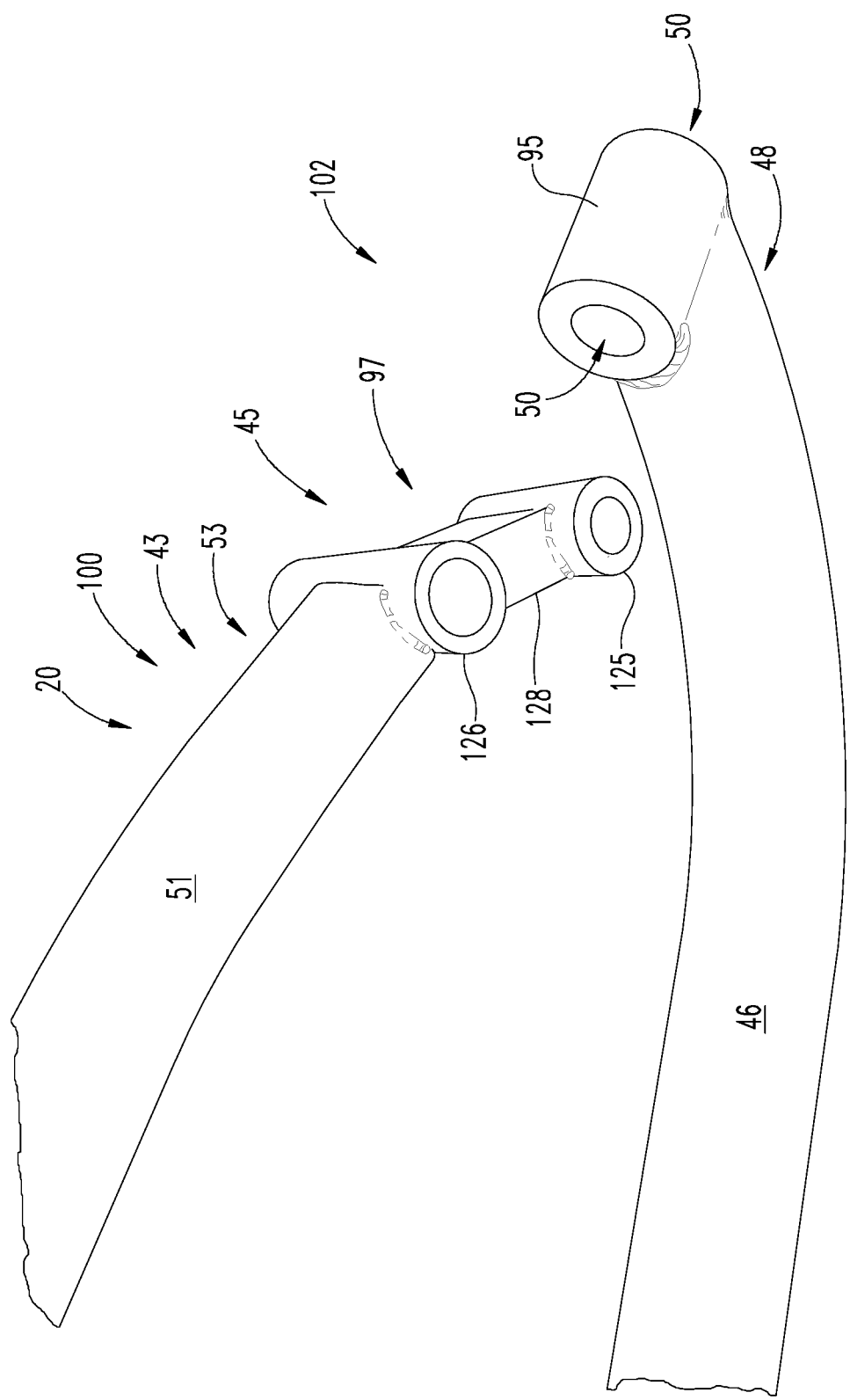
FIG. 10 is a closeup picture or drawing of right attachment ends 48 and 53 of respective lower and upper elongated frame members 46 and 51 of FIG. 9.

FIG. 10 is closeup picture of right attachment ends 48 and 53 of respective lower and upper elongated frame members 46 and 51 of FIG. 9. These ends have been configured to connect to mounting points found on, for example, a 2005-2014 Ford Mustang with a straight rear axle. For other vehicles with a straight rear axle, the shape and ends of the lower and upper elongated frame members will need to be reconfigured to connect to the desired vehicle's mounting points or brackets. One ordinarily skilled in the art should be able to reconfigure the frame for any straight rear axle on just about any vehicle. The right lower elongate member end 48 is curved upwardly as pictured, and an approximate 1.50-inch long, 1.00-inch outside diameter and 0.50-inch inside diameter, mild steel, vehicle fastener sleeve 95 is welded perpendicularly thereto. Attachment bore 50 extends through the right end vehicle fastener sleeve for receiving a machine bolt for connection to the right side of the vehicle. Second or right side, elongate frame end 53 is curved downwardly as pictured, and second or right-side vehicle attachment assembly 97 is welded thereto. Vehicle attachment assembly 97 includes right end vehicle fastener sleeve 125 and penultimate vehicle fastener sleeve 126 that are interconnected by separation bar 128. The right-end sleeve is approximately 1.90-inches long with an outside diameter of 1.00-inch and an inside diameter of 0.568. The penultimate sleeve 126 is approximately 2.40-inches long with a 1.00-inch outside diameter and a 0.568-inch inside diameter. The mild steel sleeves are interconnected by and perpendicularly welded to the ends of right end attachment bar 128 having a height of approximately 0.750-inches and a width of 1.250-inches. The ends of the separation bar are scalloped to match the 1.00-inch outside diameter of the sleeves with the center-to-center spacing of the parallel interconnected sleeves being approximately 2.125-inches. The right end of penultimate sleeve is positioned approximately 0.7640-inches from the right side of the interconnecting separation bar 128 and the downwardly curved second or right elongated frame member end 53. The right end of the right end vehicle fastener sleeve is disposed approximately 0.3310-inches from the right side of the separation bar 128. Again, all the approximate sizes and spacing is for attachment to the right-side attachment members of a 2005-2014 Ford Mustang. The size and spacing of the frame components will vary depending on the disposition of the vehicle attachment points.

Figure 11:
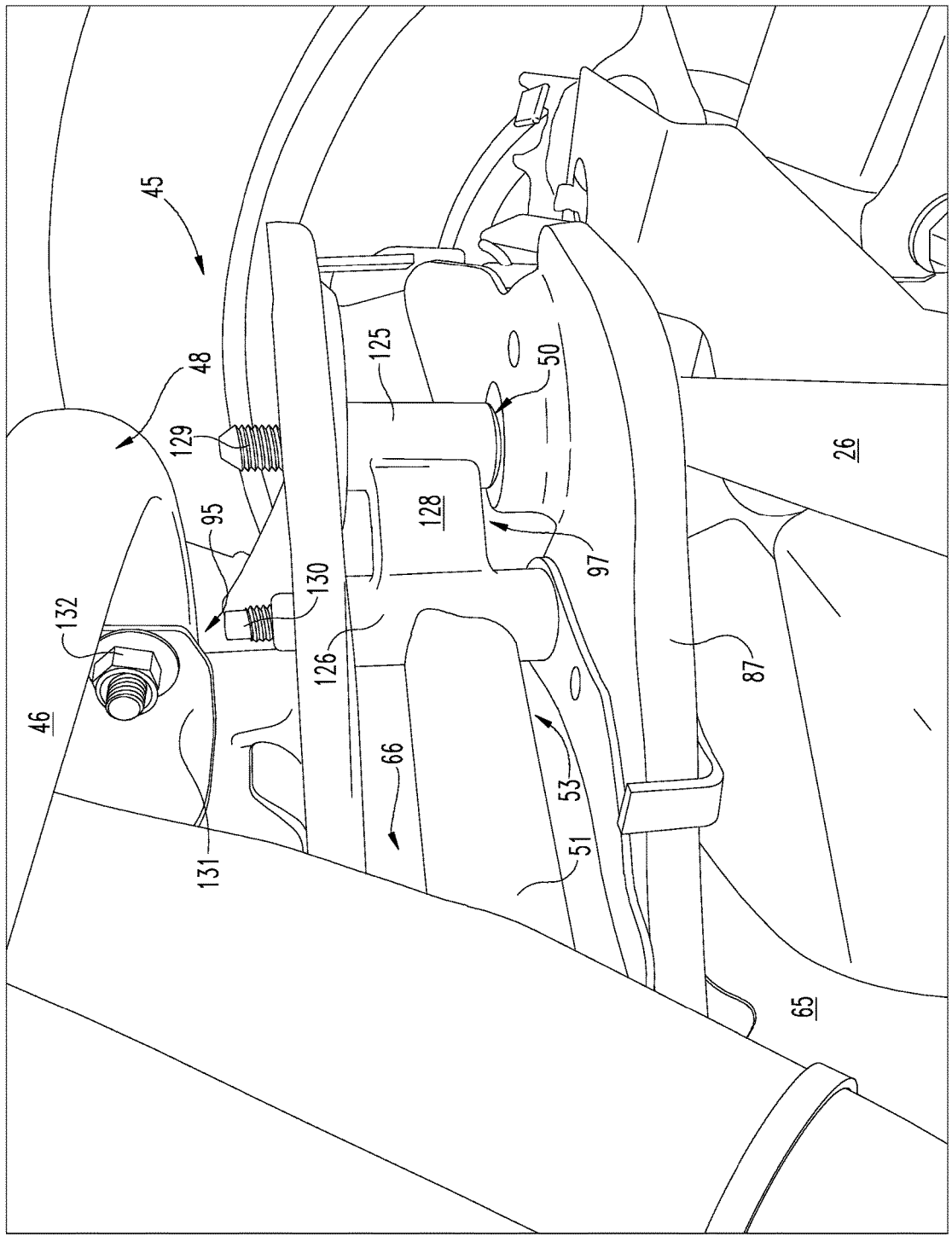
FIG. 11 pictures or illustrates right ends 48 and 53 of the upper 46 and the lower 51 elongate frame members, respectively, that are connected to the right-side 66 of vehicle 65 of FIG. 10.

FIG. 11 pictures or depicts right ends 48 and 53 of the upper 46 and the lower 51 elongate frame members, respectively, that are connected to the right-side 66 of vehicle 65 of FIG. 10. Elongate frame member end 53 is connected to second or right-side vehicle attachment assembly 97 with first or right-side 125 and second 126 vehicle attachment sleeves with respective commercially available hex-head machine bolts and locknuts 129 and 130 extending therethrough. The vehicle attachment fasteners 129 and 130 extend through the bottom side of the second or bottom side of vehicle attachment assembly 97, through right end attachment sleeve 125 and penultimate attachment sleeve 126 and the top side of attachment assembly 97. The fasteners are held in place with locknuts. The vehicle attachment assembly 97 was previously used, for example to attach a sway or anti-roll bar since removed. A second or right-side elongate member end 48 is connected to a third or U-shaped vehicle attachment member 131 with attachment fastener and locknut 132 extending through the sides of vehicle attachment member 131 and the passageway of right end sleeve 95 of the right end of lower elongate member 46.

Figure 12:
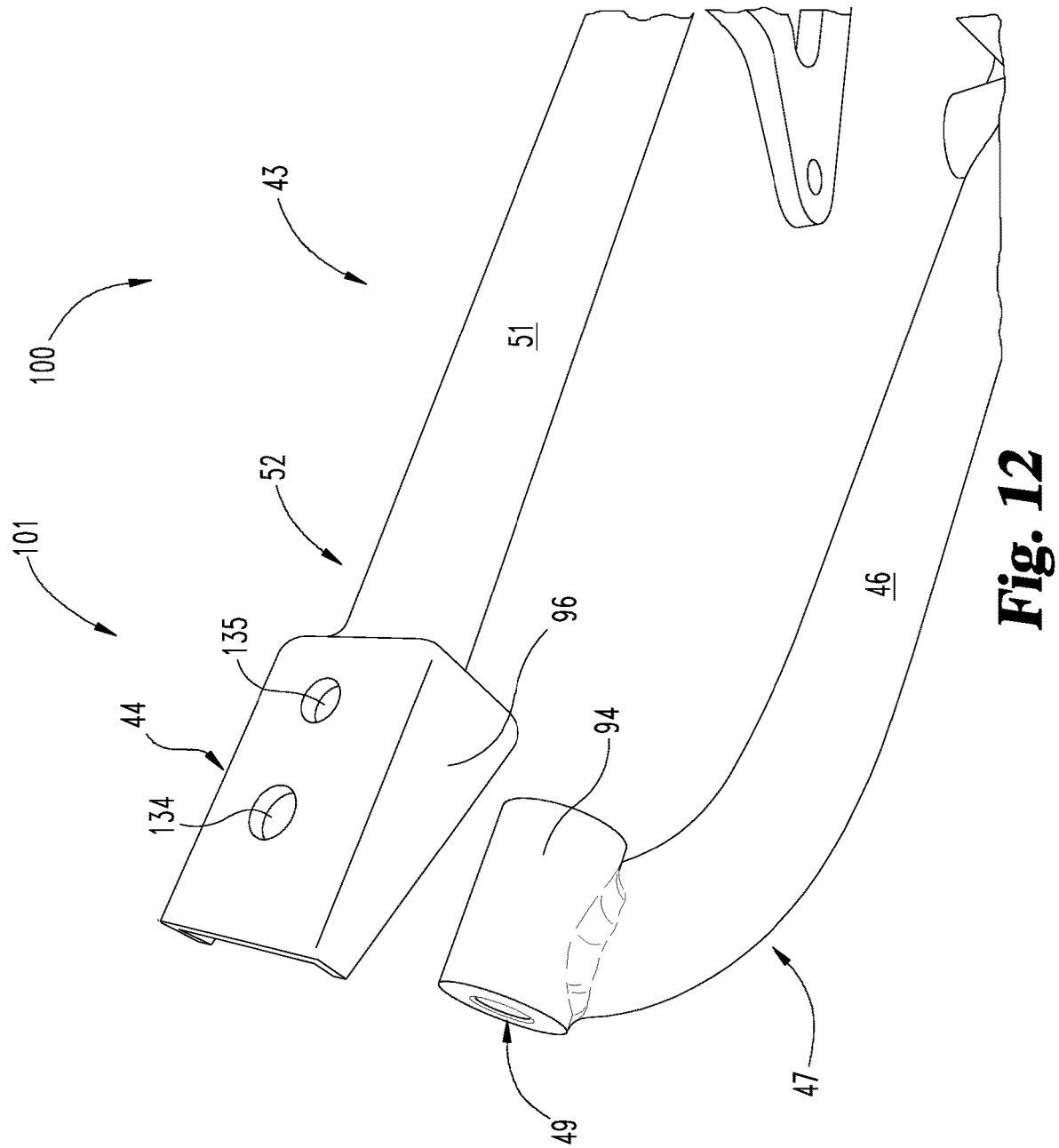
FIG. 12 pictures or illustrates the bottom left ends 47 and 52 of respective lower 46 and upper 51 elongate frame members of FIG. 13, which connect to first or left side 64 of vehicle 65 of FIG. 9.

FIG. 12 pictures the bottom or underside of left ends 47 and 52 of respective lower 46 and upper 51 elongate frame members of FIG. 9, which connect first or left side 64 of vehicle 65 of FIG. 7. First or left side fastener sleeve 114 is perpendicularly disposed and welded to curved-up, left end 47 of lower elongate member 46. Left side fastener sleeve 94 is identical to right side fastener sleeve 127. First or left side attachment bore 49 of the fastener sleeves 94 is the entrance to the the through bore of the sleeve of which a vehicle attachment fastener is disposed therethrough with an associated locknut disposed at the threaded end of the fastener. The bottom of wedge-shaped attachment member 96 is disposed in an upward facing position with a pair of attachment bores or holes 134 and 135 that are disposed for receiving two fasteners such as commercially available hex-head machine bolts. These two fasteners are aligned with two threaded holes that are formed in the chassis bottom of the vehicle. The wedge-shaped attachment member 96 is formed from a plate of 0.20-inch-thick mild steel that is perpendicularly bent to form a back plate and two side plates as pictured. The width of the attachment member is approximately 2.35-inches with the length being 3.50-inches long. The back plate is approximately 1.25-inches high with the side plates being the height of the back plate at one end and sloping down to 0.43-inches at the front end. The back plate is welded to each of the side plates and to the frame member end 52.

Figure 13:
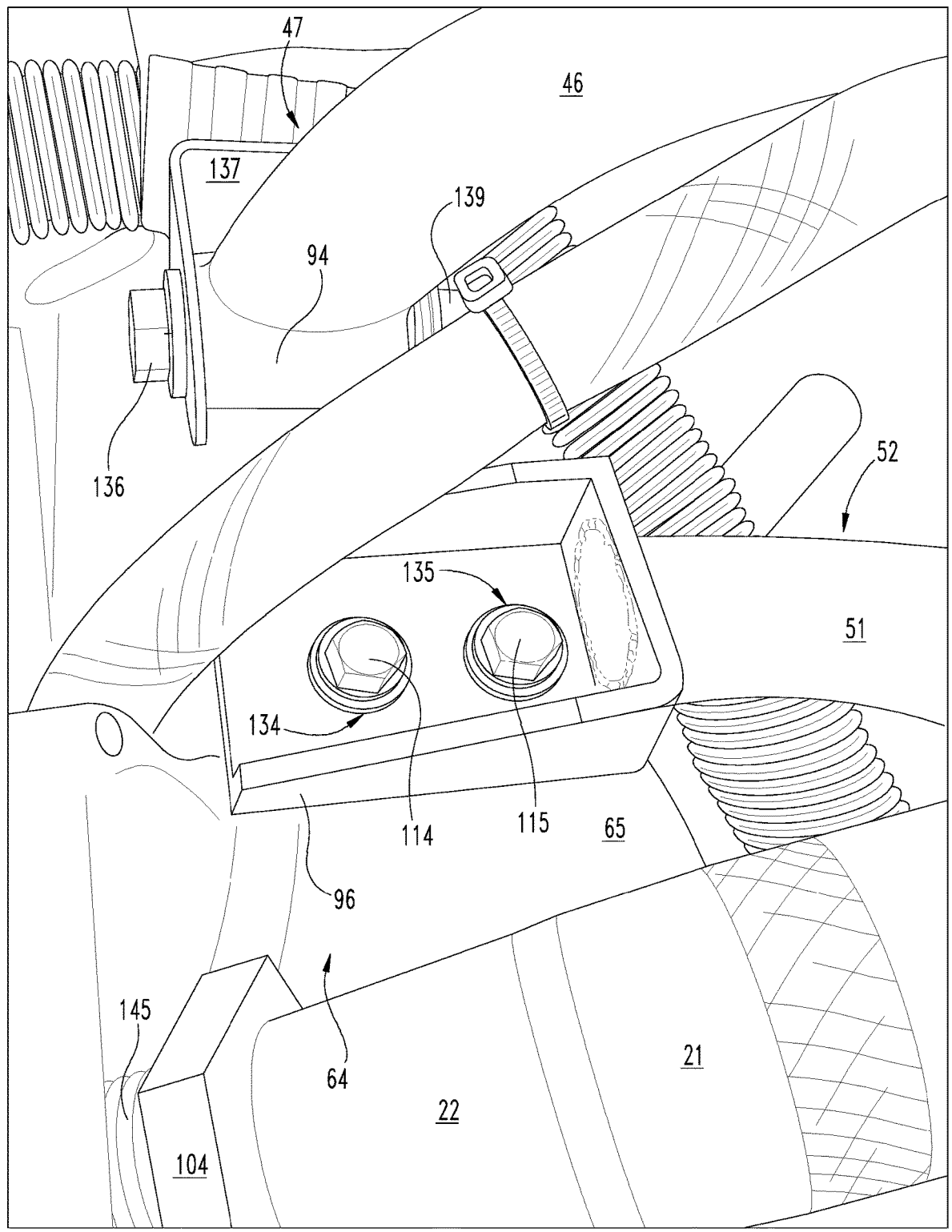
FIG. 13 pictures or illustrates wedge-shaped attachment member 96 and left side of elongate member end 47 connected to left-side vehicle attachment bracket 137 of FIG. 12.

FIG. 13 pictures or depicts wedge-shaped attachment member 96 and left-side elongate frame member end 47 connected to left-side vehicle attachment mounting bracket 137. The wedge-shaped frame attachment member 96, which is welded to the left lower elongate frame member end 52, is fastened by two mounting fasteners 114 and 115 to the left-side vehicle chassis bottom 64 of vehicle 65. The wedge-shaped attachment member 96 has two holes bored in the bottom thereof that align with two threaded mounting holes in the bottom of the vehicle chassis 64. The wedge-shaped attachment member 96 is fastened to the vehicle bottom 64 with two commercially available hex-head machine bolts 114 and 115. Left-side vehicle fastener sleeve 94 is perpendicularly welded to elongate member end 47 and connected to left-side vehicle attachment mounting bracket 137 with a commercially available fastener such as hex-head machine bolt 136 and a locknut at the threaded end of the bolt. Vehicle attachment mounting bracket 137 is originally part of the vehicle of which a suspension component is no longer needed and has been removed for the vehicle fastener sleeve 94 to connect to vehicle mounting bracket 137.

FIG. 14 is an enlarged picture of left housing end 24 of straight axle housing 25 of FIG. 7. The suspension control assembly 20 is connected to axle housing end 24 via mounting bracket 137. Left radius rod attachment member or eyebolt 82 of left radius rod 21 is fastened to left straight axle housing end 24 with first or left end vehicle attachment fastener 86 such as a commercially available hex-head machine bolt and locknut. Fastener 86 extends through left end mounting bracket 137, short cylindrical spacer sleeve 119, eyebolt 82 and left end axle housing 24.

Figure 15:
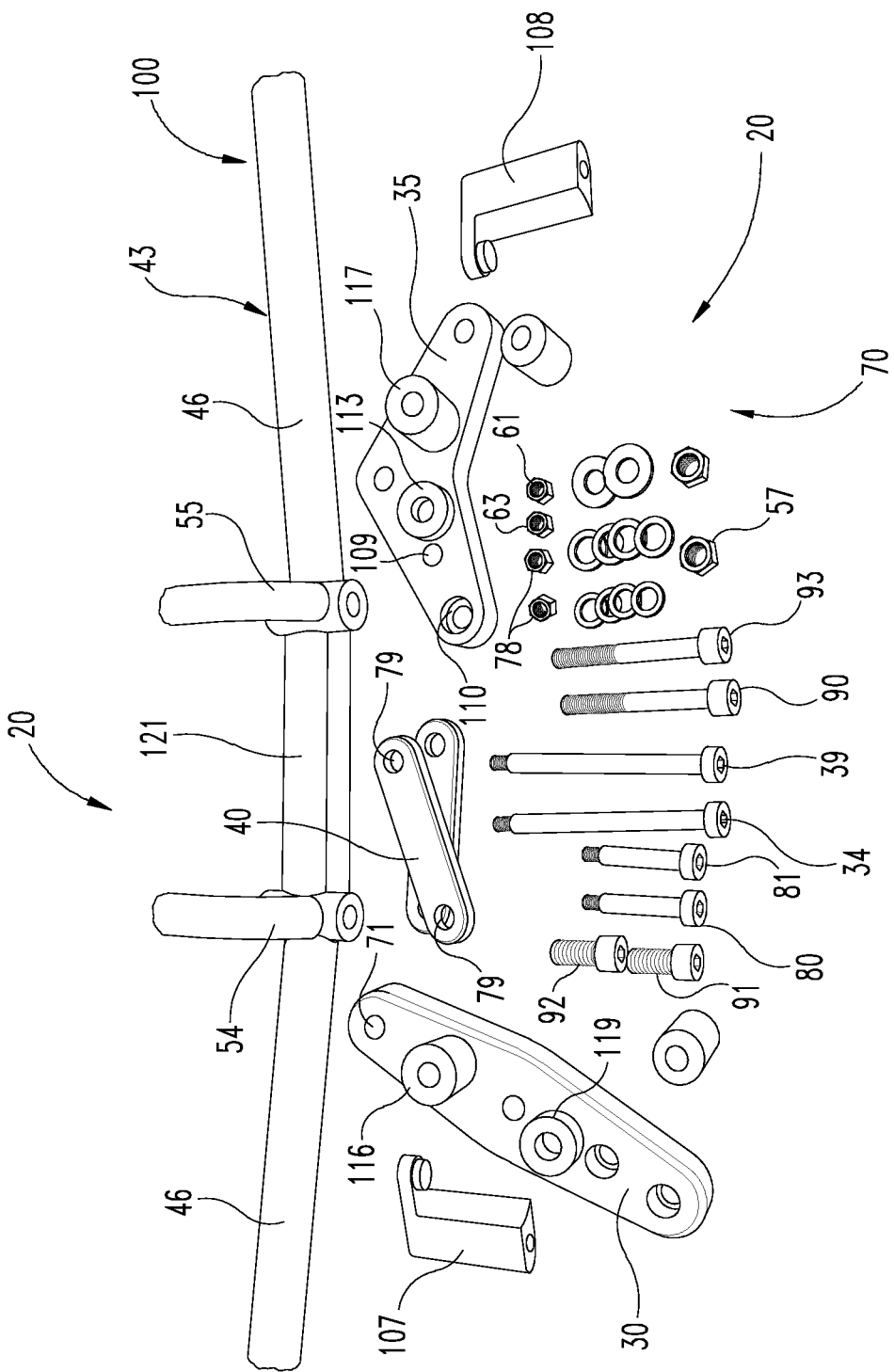
FIG. 15 pictures a partial kit of parts for the suspension control assembly of FIG. 1.

FIG. 15 pictures partial kit of parts 70 for suspension control assembly 20 of FIG. 1. The main components of the kit include straight pivot link 30 with spacers for disposition on left pivot fastener 34, asymmetrical pivot link 35 with spacers for disposition on right pivot fastener 39 and a pair of short straight links 40 that interconnect the straight pivot link and the asymmetrical pivot link with fasteners 80 and 81. As previously indicated, the kit of parts includes left and right radius rods 21 and 26 (shown in FIG. 1) and the attachment members (eyebolts) 82-85 (shown in FIG. 1) for attaching the radius rods to the two sides of the vehicle axle housing and the outside ends of the pivot links.

Frame 43 or frame module 100 includes lower and upper elongated members 46 and 51 that are interconnected by and welded to lateral interconnecting members 54 and 55 at opposite ends of center section 121. As previously pictured, a lateral extension plate is welded to and laterally extends from the upper elongated member. Two threaded bores 60 and 61 are disposed at the lower edge of the extension plate and align and laterally space themselves with the respective bores of the fastener sleeves at opposite ends of the center section to connect the control assembly or module.to the frame. Although not essential, the members and vehicle attachment ends of frame 43 are welded together to cradle the control assembly in a fixed position relative to the vehicle. The radius rods of the control assembly connect to the opposite ends of the straight axle housing to equalize the downward force on the opposite ends. The radius rods with the rest of the control assembly interact to keep equal downward force on opposite ends of the straight axle housing. As a result, the vehicle can turn through a road curve at a higher speed without letting the rear of the vehicle spin out of control. The components of the control assembly are separate and individual parts that are interconnected to control the cornering of the vehicle.

Figure 16:
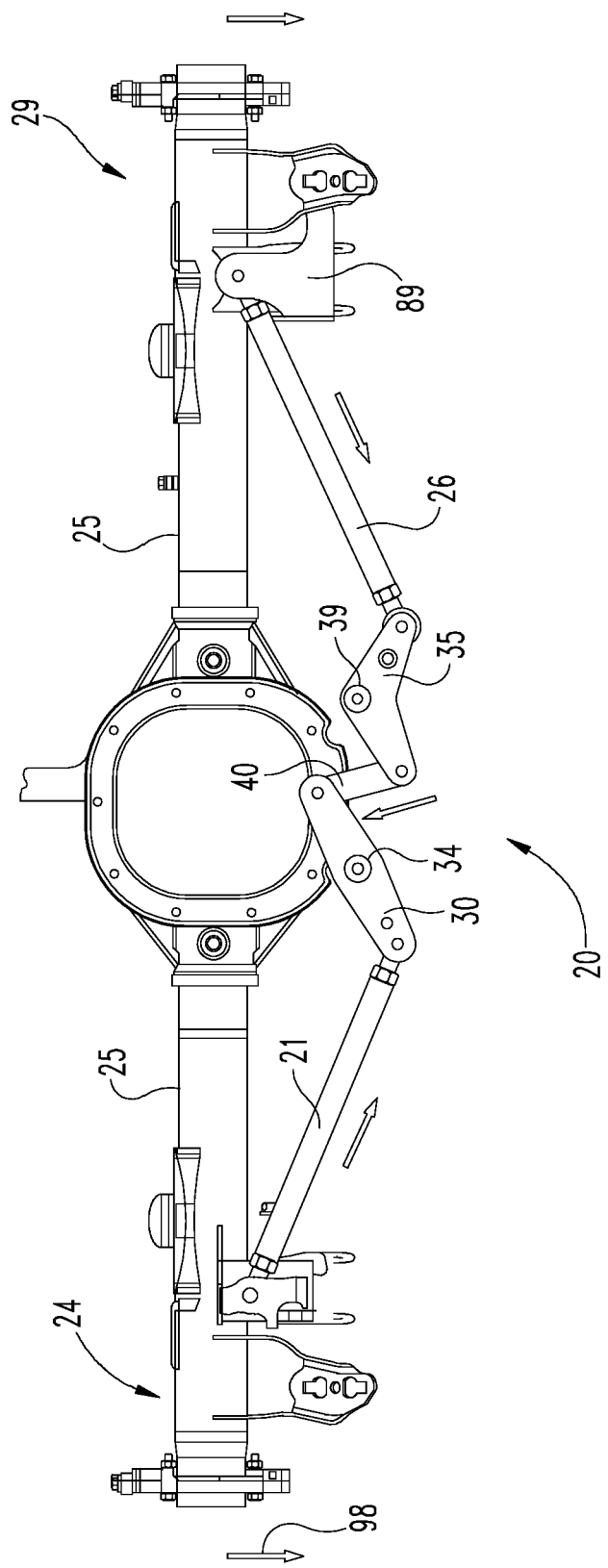
FIG. 16. is an illustrative drawing of control assembly of FIG. 1, illustrating the distribution of forces to keep equal force applied to opposite ends of the straight axle housing when the vehicle is turning either right or left in the curve of a road.
Figure 17C:
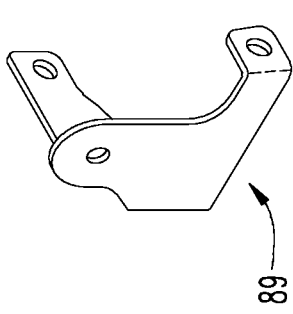
FIG. 17C depicts an isometric view.
Figure 17F:
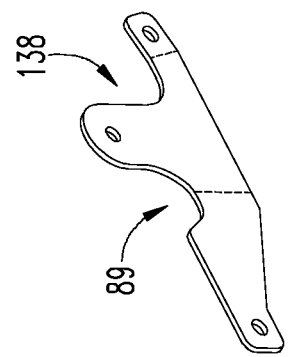
FIG. 17F depicts a isometric view of the planar view of the right radius rod axle bracket of FIGS. 8 and 16 disposed at the right axle housing end.
Figure 17B:
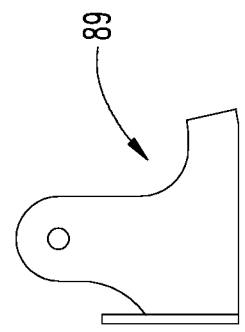
FIG. 17B depicts a front view.
Figure 17E:
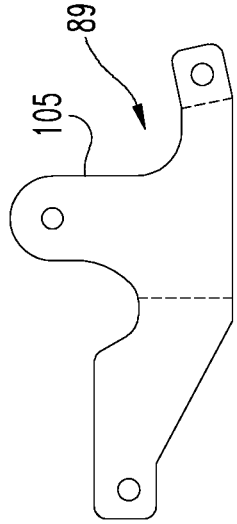
FIG. 17E depicts a planar view.
Figure 17A:
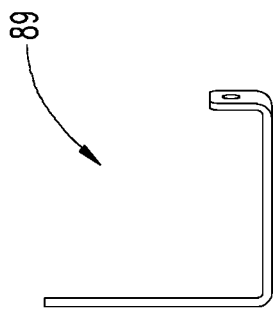
FIG. 17A depicts a top view.
Figure 17D:
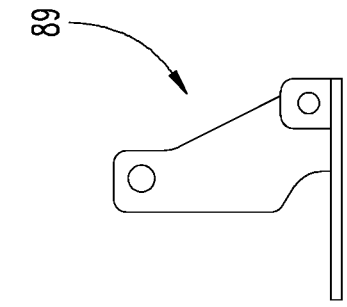
FIG. 17D depicts a side view.

FIG. 16. is an illustrative drawing of control assembly 20 of FIG. 1, illustrating the distribution of forces to keep equal force applied to opposite ends 24, 29 of the straight axle housing 25 when the vehicle is turning either right or left in the curve of a road. For example, when the vehicle is traveling in a straight line, equal downward force is applied to each axle housing end. The control assembly is said to be in state of equilibrium. When the vehicle for example makes a left turn, down force 98 increases. The left side of the vehicle chassis shortens the distance to the left axle housing end. At the same time, the right side of the vehicle chassis increases its' distance from the right axle housing end thereby decreasing the downward force applied to the right axle housing end. As the vehicle continues toward the apex of the turn, the downward force applied to the left housing end increases. This left side of the chassis tilts downward in the left turn and increases the downward force applied to the left axle housing end, while the right side of the chassis increases its' distance from the right axle housing end with less downward force being applied thereto. Depending on the speed of the vehicle in the left turn, the right side of the chassis will continue to rise with the right tire eventually rising off the ground.

The suspension control assembly compensates for this occurrence and transfers the increased downward force to the left radius rod 21 and the straight pivot link rotates counterclockwise about the stationary left pivot link fastener 34 which is part of the frame. As the right end of the straight pivot link rises, the short straight link pulls the left end of the asymmetrical pivot link 35 upward increasing the downward force along the right radius rod 26. The asymmetrical pivot link is also held stationary with respect to the control frame with the right pivot link fastener 39. The downward force on the right-side radius rod pulls the right axle end down, thereby pulling the right rear tire down. The control assembly transfers the increased downward force on the inside axle housing end to the opposite axle housing end with equal downward force being applied to each rear tire. The downward force applied to the contact patches of the tires is essentially the same as when the vehicle straight forward and the vehicle can get through the turn at a much greater speed.

FIGS. 17A-D Illustrate the views and configuration of right axle bracket 89. The bracket is comprised of a 0.188-inch mild steel sheet 138 approximately 11.25-inches by 5.11-inches, formed, bored, and bent three times as indicated in the Figures.

Throughout this specification various indications have been given as to the scope of this invention, but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

It will be appreciated by those skilled in the art that the invention is not restricted in its use to the application described. Neither is the present invention restricted in its preferred embodiment regarding the elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

It is to be also understood, however, that the above-described apparatus and kit of parts are merely an illustrative embodiment of the principles of this invention, and that other apparatus and kit of parts for using them may be devised by those skilled in the art, without departing from the spirit and scope of the invention. It is to be further understood that the invention is directed to embodiments both comprising and consisting of the disclosed parts.

The following list of elements will aid in identifying the elements in the Figs. and in the claims. This list itemizes the elements by numeric identification along with a description of the element and the Fig(s) that the element can be found.

LIST OF ELEMENTS

| No. | Element Description | FIGS. containing Element |
|---|---|---|
| 20. | Suspension Control Assembly | 1, 3, 5, 7, 9, 10, 14, 15, 16 |
| 21. | First or Left-Side Radius Rod | 1, 3, 5, 7, 13, 14, 16 |
| 22. | First or Left End of Left-Side Radius Rod 21 | 1, 7, 13 |
| 23. | Second or Right End of Left-Side Radius Rod 21 | 1, 3, 5, 7 |
| 24. | First or Left End of Straight Axle Housing 25 | 1, 7, 14, 16 |
| 25. | Straight Axle Housing | 1, 7, 14, 16 |
| 26. | Second or Right-Side Radius Rod | 1, 3, 5, 8, 16 |
| 27. | First or Left End of Right-Side Radius Rod 26 | 1, 3, 5, 8 |
| 28. | Second or Right End of Right-Side Radius Rod 26 | 1, 8 |
| 29. | Second or Right End of Straight Axle Housing 25 | 1, 8, 16 |
| 30. | Straight Pivot Link of Suspension Control Assembly 20, Control Module 99, or Kit of Parts 70 | 1, 3, 4A, 4B, 5, 6, 7 |
| 31. | Second or Right End of Straight Pivot Link 30 | 1, 3, 4A, 4B, 5, 6, 7 |
| 32. | First or Left End of Straight Pivot Link 30 | 1, 4A, 4B, 5, 6, 7 |
| 33. | Center Bore (Hole) of Straight Pivot Link 30 or Control Module 99 and Frame 43 or Frame Module 100 or included in Kit of Parts 70 | 3, 4A, 4B, 7 |
| 34. | Left Interconnection or Pivot Link Fastener (bolt) for the Interconnection of Suspension Control Assembly 20 or Control Module 99 and Frame 43 or Frame Module 100 or included in Kit of Parts 70 | 1, 3, 5, 7, 15, 16 |
| 35. | Asymmetrical Pivot Link of Suspension Control Assembly 20, Module 99, or Kit of Parts 70 | 1, 2A, 2B, 3, 5, 6, 7, 8, 15, 16 |
| 36. | First or Left End of Asymmetrical Pivot Link End 35 | 1, 2A, 2B, 5, 6, 7 |
| 37. | Second or Right End of Asymmetrical Pivot Link 35 | 1, 2A, 2B, 3, 5, 7, 8 |
| 38. | Pivot Link Bore (Hole) of Asymmetrical Pivot Link 35 | 2A, 2B, 3, 4, 7, 8 |

-continued

LIST OF ELEMENTS

| No. | Element Description | FIGS. containing Element |
|---|---|---|
| 39. | Right Interconnection or Pivot Link Fastener (bolt) for the Interconnection of Suspension Control Assembly 20 or Control Module 99 and Frame 43 or Frame Module 100 or included in Kit of Parts 70 | 1, 3, 5, 7, 8, 16 |
| 40. | Short Straight Link of Suspension Control Assembly 20 Or Module 99, which is also included in Kit of Parts 70 | 1, 3, 5, 6, 7, 15, 16 |
| 41. | First or Left End of Short Straight Link 40 | 3, 5, 6, 7 |
| 42. | Second or Right End of Short Straight Link 40 | 5, 6, 7 |
| 43. | Frame | 1, 7, 9, 10, 12, 15 |
| 44. | First or Left Frame Attachment End of Frame 43 or Frame Module 100 | 9, 12 |
| 45. | Second or Right Frame Attachment End of Frame 43 or Frame Module 100 | 9, 10, 11 |
| 46. | First or Lower Elongate Frame Member of Frame 43 or Frame Module 100 | 1, 3, 7, 8, 9, 10, 11, 12, 13, 15 |
| 47. | First or Left End of Lower Elongate Frame Member 46 | 1, 9, 12, 13 |
| 48. | Second or Right End of Lower Elongate Frame Member 46 | 8, 9, 10, 11, |
| 49. | First or Left-Side, Vehicle Attachment Bore ((Hole) of Left-Side, Vehicle Fastener Sleeve 94 | 3, 9, 12 |
| 50. | Second or Right-Side, Vehicle Attachment Bore (Hole) Of Right-Side, Vehicle Fastener Sleeve 125 of Frame 43 or Frame Module 100 | 9, 10, 11 |
| 51. | Second or Upper Elongate Frame Member of Frame 43 or Frame Module 100 | 1, 3, 7, 9, 10 11, 12, 13 |
| 52. | Left End of Upper Elongate Frame Member 51 | 9, 12, 13 |
| 53. | Right End of Upper Elongate Frame Member 51 | 1, 9, 10, 11 |
| 54. | First or Left-Side Lateral Interconnecting Member Between Lower 46 and Upper 51 Elongate Frame Members | 1, 3, 9, 15 |
| 55. | Second or Right-Side Lateral Interconnecting Member Between Lower 46 and Upper 51 Elongate Frame Members | 1, 3, 9, 15 |
| 56. | Bore of Left, Center Section Fastener Sleeve 123 | 3, 7, 9 |
| 57. | Locknut Disposed on First or Left-Side Threaded Bolt End 63 of Fastener 34 | 3, 15 |
| 58. | Bore of Right, Center Section Fastener Sleeve 124 | 3, 7, 8, 9 |
| 59. | Threaded Bolt End of Second or Right-Side Pivot Fastener 39 | 3 |
| 60. | First or Left Lower Bore (Hole) of Extension Plate 120 | 9 |
| 61. | Locknut Disposed on Second or Right-Side Threaded Bolt End 59 of Fastener 39 | 3 |
| 62. | Second or Right Lower Bore (Hole) of Extension Plate 120 | 9 |
| 63. | Threaded Bolt End of First or Left-Side Pivot Fastener 34 | 3 |
| 64. | First or Left Bottom Side of Vehicle 65 | 7, 13, 14 |
| 65. | Vehicle | 7, 8, 11, 13 14 |
| 66. | Second or Right Bottom Side of Vehicle 65 | 11 |
| 67. | First or Left Leg of Asymmetrical Pivot Link 35 | 1, 2A, 2B, 3, 8 |
| 68. | Second or Right Leg of Asymmetrical Pivot Link 35 | 2A, 2B, 3, 8 |
| 69. | Not Shown | — |
| 70. | Kit of Parts for Suspension Control Assembly 20 | 15 |
| 71. | Right End Connection Bore (Hole) of Straight Pivot Link End 31 | 1, 4A, 4B, 15 |
| 72. | First or Left Retainer Bore (Hole) of Straight Pivot Link End 32 | 1, 4A, 4B |
| 73. | Penultimate Retainer Bore (Hole) of Straight Pivot Link End 32 | 1, 4A, 4B |
| 74. | First or Left Connection Bore (Hole) of Left Asymmetrical Leg End 36 | 2A, 2B |
| 75. | Second or Right Retainer Bore (Hole) of Right Asymmetrical Leg End 68 | 2A, 2B |
| 76. | Angle Between First 67 and Second 68 Pivot Link Legs | 2A |
| 77. | Intersection of First 67 and Second 68 Pivot Link Legs | 2A |
| 78. | Locknuts for Fasteners 80 & 81 | 6 |
| 79. | Connection Bore Through Left End 80 & Right End 81 of Short Straight Link Pair 40 | 6 |
| 80. | First Interconnection Fastener (Bolt) for Left Short Straight Link End 41 | 3, 5, 6, 7, 15 |
| 81. | Second Interconnection Fastener (Bolt) for Right Short Straight Link End 42 | 5, 6, 7, 15 |
| 82. | First or Left Attachment Member (Eyebolt) at Left Radius Rod End 22 | 1, 7, 14 |

-continued

LIST OF ELEMENTS

| No. | Element Description | FIGS. containing Element |
|---|---|---|
| 83. | Second or Right Attachment Member (Eyebolt) at Left Radius Rod End 23 | 1, 7 |
| 84. | First or Left Attachment Member (Eyebolt) of Right Radius Rod End 27 | 1, 3, 8 |
| 85. | Second or Right Attachment Member (Eyebolt) at Right Radius Rod End 28 | 1, 8 |
| 86. | First or Left End Vehicle Attachment Fastener & Locknut (Bolt & Locknut)) for Left Vehicle Side 64 | 7, 14 |
| 87. | Second or Right End Vehicle Attachment Fastener & Locknut (Bolt & Locknut) for Right Vehicle Side 66 | 8 |
| 88. | Short Leg of L-shaped Retainer 108 | 8 |
| 89. | Radius Rod Right Axle Bracket | 8, 16, 17A-F |
| 90. | First End, L-shaped Retainer Fastener (Bolt) for Right, Asymmetrical Pivot Link End 37 | 1, 5, 8, 15 |
| 91. | Penultimate, L-shaped Retainer Fastener (Bolt) for Right, Asymmetrical Pivot Link End 37 | 5, 8, 15 |
| 92. | Penultimate, L-shaped Retainer Fastener (Bolt) for Left, Straight Pivot Link End 31 | 1, 5, 7, 15 |
| 93. | Left End, L-shaped Retainer Fastener (Bolt) for Left, Straight Pivot Link End 31. | 1, 5, 7 |
| 94 | Left-Side Vehicle Attachment Sleeve at Left, Lower Elongate Member End 47 | 1, 9, 12, 13 |
| 95. | Right-Side Vehicle Attachment Sleeve At Right, Lower Elongate Member End 48 | 8, 9, 10, 11 |
| 96. | Wedge-Shaped Vehicle Attachment Assembly at Left, Upper Elongate Member End 52 | 1, 9, 12 |
| 97. | Right-Side Vehicle Attachment Assembly At Right End 53 of Upper Elongate Member 51 | 9, 10, 11 |
| 98. | Applied Downward Force | 16 |
| 99. | Suspension Control Module of 20 | 1, 3, 5, 6 |
| 100. | Frame Module of 20 | 1, 3, 5, 7, 9, 10 |
| 101. | Left Frame Attachment End of Frame 43 or Frame Module 100 | 1, 9, 12 |
| 102. | Right Frame Attachment End of Frame 43 or Frame Module 100 | 1, 9, 10 |
| 103. | Display Stand for Suspension Control Assembly 20 | 1 |
| 104. | Right-Hand Threaded Locknut Disposed Adjacent Left Radius Rod End 27 | 1, 3, 7, 13, 14 |
| 105. | Left-Hand Threaded Locknut Disposed at Right Radius Rod End 23 (Not Shown) | 1 |
| 106. | Penultimate Retainer Bore of Right Asymmetrical Pivot Link Leg 68 | 2A, 2B |
| 107. | L-shaped Retainer for Left Straight Pivot Link Leg End 32 | 7, 15 |
| 108. | L-shaped Retainer for Right Asymmetrical Link Leg End 37 | 3, 8, 15 |
| 109. | Counterbore of Penultimate Retainer Bore 106 | 2A, 2B, 8 |
| 110. | Right Counterbore of Right Retainer Bore (Hole) 75 | 1, 2A, 2B, 8, 15 |
| 111. | Short Leg of L-Shaped Retainer 107 | 7 |
| 112. | Short Cylindrical Spacer Sleeve for Eyebolt 85 | 8 |
| 113. | Left-Hand Threaded Locknut Disposed at Right Radius Rod End 28 | 1, 8 |
| 114. | Frame Attachment Bolt | 13 |
| 115. | Frame Attachment Bolt | 13 |
| 116. | Long Cylindrical Spacer Sleeve for Right Eyebolt 83 | 1, 7, 15 |
| 117. | Long Cylindrical Spacer Sleeve for Left Eyebolt 84 | 3, 8, 15 |
| 118. | not shown | |
| 119. | Short Cylindrical Spacer Sleeve For Left Eyebolt 82 | 7, 14 |
| 120. | Lateral Extension Plate | 1, 3, 7, 9 |
| 121. | Center Section Separation Bar Disposed Midway in Lower Elongated Member 46 | 1, 3, 8, 9, |
| 122. | Long Leg of Retainer 107 | 7 |
| 123. | First or Left Fastener Sleeve of Center Section 121 | 3, 7, 9 |
| 124. | Second or Right Fastener Sleeve of Center Section 121 | 3, 8, 9 |
| 125. | Right End Vehicle Attachment Sleeve Disposed At Upper, Right Frame Member End 53 | 9, 10, 11 |

-continued

LIST OF ELEMENTS

| No. | Element Description | FIGS. containing Element |
|---|---|---|
| 126. | Penultimate End Vehicle Attachment Sleeve Disposed at Upper Elongate Frame Member End 53 | 9, 10, 11 |
| 127. | Indented Portions with Cross Member | 3, 5, 6, 7 |
| 128. | Separation Bar between End Attachment Sleeves 125 & 126 | 9, 10 |
| 129. | First, Right-Side Vehicle Attachment Fastener (Bolt & Locknut) | 11 |
| 130. | Penultimate, Right-Side Vehicle Attachment Fastener (Bolt & Locknut) | 11 |
| 131. | Right-Side Vehicle Mounting Bracket | 11 |
| 132. | Third or Right-Side Attachment Fastener (Bolt & Locknut) | 11 |
| 133. | Counterbore | 6 |
| 134. | Vehicle Attachment Fastener Bore (Hole) for Hex-Head Bolt & Washer | 12, 13 |
| 135. | Vehicle Attachment Fastener Bore (Hole) for Hex-Head Bolt & Washer | 6, 12, 13 |
| 136. | Third Vehicle Attachment Fastener or Hex-Head Bolt & Locknut | 13 |
| 137. | Left-Side Vehicle Mounting Bracket | 7, 13, 14 |
| 138. | Mild Steel Sheet | 8, 17 |
| 139. | Locknut for fastener at Left End of Housing Bracket | 13 |
| 140. | Penultimate Counter Bore of Retainer Bore 73 of Left Straight Pivot Link End 32 | 4A, 4B, 7 |
| 141. | Left Counter Bore of Retainer Bore 72 of Left Straight Pivot Link End 32 | 4A, 4B, 7 |
| 142. | OILITE (R) material bearing sleeve | 2A, 2B, 4A, 4B, 6 |
| 143. | Long Leg of L-shaped Retainer 108 | 3, 8 |
| 144. | Bore of Bearing Sleeve 142 | 2A, 2B, 4A, 4B |
| 145. | Right-Hand Threads of Eyebolt 84 | 1, 3 |
| 146. | Left-Hand Threads of Eyebolt 83 | 1 |
| 147. | Lower Extension Plate Edge | 1, 3, 9 |
| 148. | Top Edge of Lateral Extension Plate | 9 |

What is claimed is:

1. A suspension control assembly for a vehicle comprising:

a suspension control module having a first or left-side radius rod and a second or right-side radius rod, wherein a first or left radius rod end of the first or left-side radius rod is configured to connect to a first housing end of a straight axle housing, and a second or right radius rod end of the second or right-side radius rod is configured to connect a second housing end, opposite the first housing end, of the straight axle housing, a straight pivot link configured to connect to a second or right radius rod end of the first or left-side radius rod and having a first pivot link bore, and an asymmetrical pivot link configured to connect to the straight pivot link and a first radius rod end of the second or right-side radius rod;

a frame module having a first or left elongate frame member end configured to connect to a first side of a vehicle, a second or right elongate frame member end, opposite the first or left elongate frame member end, configured to connect to a second side of the vehicle, a third elongate frame member end configured to connect to the first side of the vehicle, and a fourth elongate frame member end, opposite the third elongate frame member end, configured to connect to the second side of the vehicle, and a first or left fastener configured to interconnect the suspension control module and the frame module and extend through the first pivot link bore of the straight pivot link, and a second or right fastener configured to interconnect the suspension control module and the frame module and extend through the second pivot link bore of the asymmetrical pivot link;

wherein when the suspension control module is connected to the opposite ends of the straight axle housing, the frame module is connected to the opposite sides of the vehicle and when a downward force is applied to one of the straight axle housing ends, the other end is pushed down to maintain the straight axle housing in a level position during vehicle cornering.

2. The suspension control assembly of claim 1, wherein the suspension control module further comprises:

a short straight link shorter in length than the straight pivot link and to interconnect the straight and the asymmetrical pivot links.

3. The suspension control assembly of claim 1, wherein the frame module comprises:

a first or lower elongate frame member having the first and the second elongate frame member ends and including respective first and second fastener sleeves disposed at respective first or left end and second or right end of center section member bar centrally disposed between the first and the second lower elongate frame member ends, the first and the second fastener sleeves having respective first and second bores therethrough;

the first and the second fastener configured to extend through the first and the second fastener bore, respectively.

4. The suspension control assembly of claim 3, wherein the frame module further comprises:
a second or upper elongate frame member having the third and the fourth elongate frame member ends and spaced longitudinally apart from the first or lower elongate frame member.

5. The suspension control assembly of claim 4, wherein the frame module also comprises:
a first or left side and a second or right-side interconnecting members disposed laterally apart and configured to perpendicularly interconnect the first and the second elongate frame members;
a lateral extension plate configured to connect to and laterally extend from the second elongate frame member and being radially disposed from the first and the second interconnecting members;
the lateral extension plate having a third or left-side (60) and a fourth or right-side (62) fastener bore radially disposed from the second elongate frame member, the first and the second fastener configured to extend through the first and the second fastener bores, respectively, the third and the fourth fastener bore configured to align with the first and the second fastener bores, respectively.

6. The suspension control assembly of claim 1, wherein the asymmetrical pivot link further comprises:
a first link leg disposed between the third link end and the second pivot point bore and a second link leg connected to the first link leg and between the fourth link end and the second pivot point bore, wherein the first and the second link leg have a leg angle therebetween, the leg angle in a range of 95 degrees to 175 degrees.

7. The suspension control assembly of claim 1, wherein the suspension control module comprises:
a first, a second, a third and a fourth radius rod attachment member disposed at the first, second, third and fourth radius rod ends, respectively.

8. A kit of parts for a suspension control assembly connectable to a straight axle housing of a vehicle comprising
a straight pivot link having a first and a second opposite the first, straight link end including a first and a second link end connection bore, respectively, and a first pivot point bore disposed between the first and the second end connection bores;
an asymmetrical pivot link having a first and a second opposite the first, link leg and having a first and a second leg end bore, respectively, a leg angle in the range of between 105 degrees and 165 degrees at an intersection of the first and the second asymmetrical link legs and a second pivot bore disposed at the intersection;
a short straight link shorter in length than the first straight pivot link and having a connection bore at each end thereof;
a first radius rod having a first and a second opposite the first, rod end;
a second radius rod having a third and a fourth opposite the first, rod end;
a first elongate frame member having a first or left and a second or right elongate frame member end configured to connect to respective first and second vehicle attachment members disposed on opposite sides of a vehicle, the first elongate frame member having a first and a second fastener bore disposed centrally there along;
a second elongate frame member having a first or left and a second or right elongate frame member end configured to connect to the first or left and the second or right sides of the vehicle, respectively;
a first and a second lateral extension configured to be fixedly disposed laterally and centrally along the second elongate frame member, the second lateral extension having a third and a fourth fastener bore disposed along a far edge thereof and configured to align with the first and the second fastener bores of the first elongate frame member, respectively;
a first fastener configured to pass through the first and the third extension bores of the first elongate frame member and the lateral extension member, respectively, and through the first pivot point bore of the straight pivot link;
a second fastener configured to pass through the second and the fourth extension bores of the first elongate frame member and the lateral extension, respectively, and through the second pivot point bore of the asymmetrical pivot link; and
a plurality of fasteners several configured to interconnect a selected link end with another selected link end and others configured to interconnect yet another selected link end and a selected radius rod end.

9. The kit of parts of claim 8, wherein a first fastener of the plurality is configured to interconnect the first link end of the straight pivot link and the second radius rod end of the first radius rod;
a second fastener of the plurality is configured to interconnect the second link end of the straight pivot link and the fifth link end of the short straight link;
a third fastener of the plurality is configured to interconnect the sixth link end of the short straight link and the third link end of the asymmetrical pivot link; and
a fourth fastener of the plurality is configured to interconnect the fourth link end of the asymmetrical pivot link and the third rod end of the second radius rod.

10. The kit of parts of claim 8 further comprising,
a first and a second attachment member configured to be disposed at the first and the second radius rod end, respectively: and
a third and a fourth attachment member configured to be disposed at the third and fourth radius rod end, respectively.

11. The kit of parts of claim 10 further comprising
a third attachment member configured to interconnect the first elongate member end and the first vehicle attachment member; and
a fourth attachment member configured to interconnect the second elongate member end and the second vehicle attachment member.

12. The kit of parts of claim 11 further comprising
a fifth elongate attachment member configured to interconnect the third elongate member end and the first axle housing end; and
a sixth elongate attachment member configured to interconnect the fourth elongate member end and the second axle housing end.

13. The kit of parts of claim 8 further comprising
a first attachment member configured to interconnect the first radius rod end and the first axle housing end; and
a second attachment member configured to interconnect the fourth radius rod end and the second axle housing end.

14. A suspension control assembly for a straight axle housing of a vehicle comprising:
- a first radius rod having a first and a second radius rod end opposite the first, the first radius rod end configured to connect to a first housing end of a straight axle housing;
- a second radius rod having a third and a fourth radius rod end, the fourth radius rod end configured to connect to a second housing end of the axle housing;
- a straight pivot link having a first and a second straight link end opposite the first, and a first pivot point bore disposed between the first and the second straight link end, the first straight link end configured to connect to the second radius rod end;
- a first fastener configured to be fixedly disposed with respect to the axle housing and extending through the first pivot point bore and a first elongated member fastener bore;
- an asymmetrical pivot link having a third and a fourth link end and a second pivot point bore configured to be disposed between the third and the fourth asymmetrical link end, the fourth asymmetrical link end being configured to connect to the third radius rod end;
- a second fastener configured to be fixedly disposed with respect to the axle housing and extend through the second pivot point bore and a second elongated member fastener bore; and
- a short straight link shorter in length than the straight link and having a first and a second short straight link end opposite the first, and being configured to interconnect with the second straight link end and the third asymmetrical link end, respectively;
- whereby a first downward force applied to one end of the axle housing pushes the other end of the axle housing downward to maintain the axle housing in a substantially level position.

15. The suspension control assembly of claim 14 further comprising:
- a first elongate frame member having the first and the second elongate frame member ends and including the first and the second fastener bore disposed between the first and the second elongate frame member ends.

16. The suspension control assembly of claim 14 further comprising:
- a second elongate frame member having the third and the fourth elongate frame member ends and configured to be spaced longitudinally apart from the first elongate frame member.

17. The suspension control assembly of claim 14 further comprising:
- a first and a second interconnecting members, both interconnecting members connected to and perpendicularly extending from the second elongate frame member and laterally spaced apart from one another;
- the first lateral extension also connected to the first elongate frame member; and
- the second lateral extension having a third and a fourth fastener bore having the first and the second fastener extending therethrough, respectively, the third and the fourth fastener bores configured to be aligned with the first and the second fastener bores, respectively.

18. The suspension control assembly of claim 14, wherein the asymmetrical pivot link further comprises:
- a first leg between the third link end and the second pivot point bore and a second leg connected to and between the fourth link end and the second pivot point bore, wherein the first and the second leg have a leg angle therebetween, the leg angle being in a range of 95 degrees to 175 degrees, preferably, 115 degrees to 160 degrees, more preferably, and 155 degrees to 160 degrees, most preferably.

19. The suspension control assembly of claim 14 further comprising:
- a first and a fourth radius rod attachment member configured to be disposed at the first and the fourth radius rod end, respectively.

20. The suspension control assembly of claim 19 further comprising:
- a second and a third radius rod attachment member configured to be disposed at the second and the third radius rod end, respectively.

* * * * *